distinct display position for determining the location of said correct answer, a position selector switch for receiving the continuous output of digital signals from said shift register and for controlling the output of said electronic switches, and a data control switch for randomly stopping said shift register, the output of said register determining the location of said correct answer in said display positions.

48. The combination of claim 45 and further comprising:

a plurality of switches corresponding to each of the data display positions for selecting an answer, and means for blanking the display position displaying an incorrect answer upon its selection.

49. The combination of claim 46 wherein said two positions electronic switches comprise multivibrators.

50. The combination of claim 46 and further comprising:

a problem display for formatting an arithmetic problem, means for generating digital clock signals, a plurality of data selectors composing an electronic switch continuously rotated through all of the switch positions by said digital clock signals, thereby enabling the problem to be solved to said problem display and the correct and incorrect answers to be displayed in said answer display, means for detecting the operation mode of the training system, and at least one operation selector switch responsive to said detecting means for selectively routing the problem to be solved on the correct answer to said data selectors.

51. The combination of claim 45 and further comprising:

means for suppressing the display of leading zeros in answers displayed by said answer display.

52. The combination of claim 45 wherein said means for computing in incorrect answer comprises:

a free running oscillator, a plurality of incorrect answer shift registers clocked by said oscillator, means for generating digital clock signals, a decade counter pulsed by said digital clock signals, a control shift register responsive to the computation of a correct answer by the trainer, a ring counter operated by said control shifter for enabling successive ones of said incorrect answer shift registers to load data from said decade counter, a plurality of exclusive OR gates, a plurality of data selectors for loading the output from said incorrect answer shift registers to one side of said OR gate upon said data selectors being enabled by said ring counter, a correct answer selector for loading the correct answer on the other side of said OR gate, means for loading a next number into the enabled one of said incorrect answer shift registers from said decade counter upon said OR gates indicating the correct answer and the output of said incorrect answer shift register are the same, and means for advancing said control shift register to the next one of said incorrect answer shift registers upon said OR gate detecting that the correct answer differs from the output of the enabled one of said incorrect answer shift registers.

53. The electronic circuit of claim 52 and further comprising:

a two position electronic control switch for applying a clock pulse to the plurality of said incorrect answer shift registers upon said OR gates first detecting a difference between the output of said incorrect answer shift registers and the correct answer.

54. In a mathematics training system, the combination comprising:

means for selectively entering an arithmetic problem to be solved, means for computing the correct answer for a problem to be solved, means for randomly generating a sequence of numbers, means for comparing the correct answer to the randomly generated numbers, means for selecting a randomly generated number determined by said comparing means to be different from the correct answer, and means for displaying the correct answer and a randomly generated number determined by said selecting means.

55. The combination of claim 54 wherein said selecting means operates only upon the second number determined by said comparing means to be different from the correct answer, thereby preventing the same randomly generating numbers from being repeatedly selected.

56. An electronic mathematics trainer comprising:

means for automatically generating a random arithmetic problem;

means for automatically entering the randomly generated arithmetic problem, a display unit for displaying the arithmetic problem automatically entered, means for computing a correct answer to the automatically entered arithmetic problem, means for generating at least one incorrect answer to the automatically entered arithmetic problem, means on said display unit for randomly displaying the correct and incorrect answer, means operable for selecting one of the displayed answers, and means for clearing the arithmetic problem displayed by said display unit on selection of the correct displayed answer.

57. The electronic mathematics trainer of claim 56 wherein said display unit includes means for entering the correct answer in the display of the arithmetic problem upon selection of the correct displayed answer.

58. The electronic mathematics trainer of claim 56 and further comprising: means for indicating the selection of the correct displayed answer.

59. The electronic mathematics trainer of claim 56 and further comprising: means for indicating the selection of an incorrect displayed answer.

60. The electronic mathematics trainer of claim 56 and further comprising: means for selecting the arithmetic operation for the automatically generated random arithmetic problem.

61. The electronic mathematics trainer of claim 56 and further comprising: means for selecting random generation of the operation mode of the automatically randomly generated arithmetic problem.

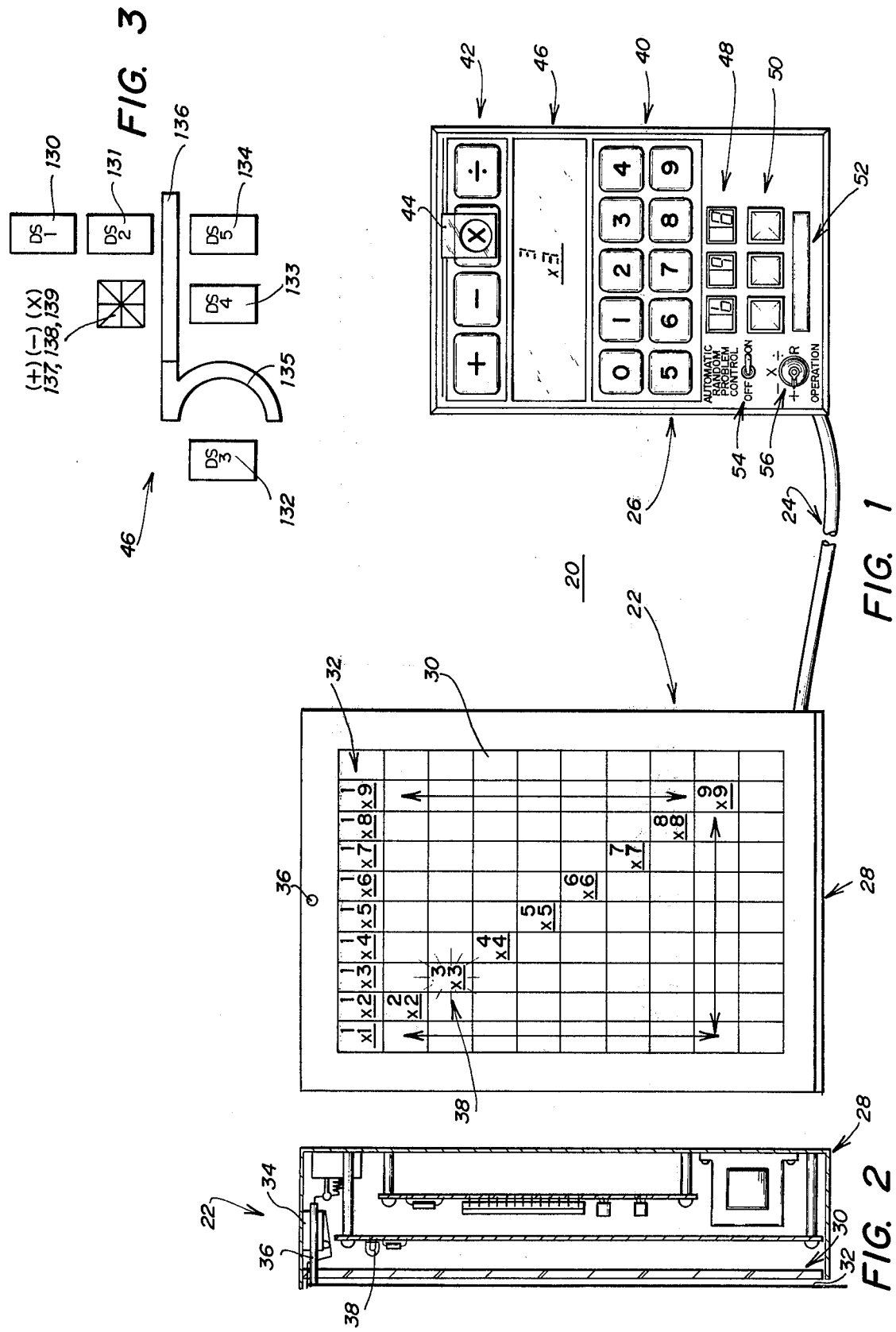

ELECTRONIC MATHEMATICS TRAINER

FIELD OF THE INVENTION

This invention relates to training devices, and more particularly relates to a device and technique for teaching arithmetic skills.

THE PRIOR ART

A variety of different types of systems have been heretofore developed for teaching mathematical and arithmetic skills to students and the like. Many of the previously developed systems have required the teacher to input a desired arithmetic problem which must be solved by a plurality of students. Such systems have not then enabled students to work the problems at their own rate in accordance with their individual skills. Moreover, such previously developed systems have not attempted to reinforce the skills being learned by requiring the students to input the problem being solved. Prior mathematic teaching systems have also not been completely satisfactory in reinforcing the correct solution to the problem to the student, and have not provided sufficient reward to a student for the correct and speedy solution of a particular problem.

SUMMARY OF THE INVENTION

In accordance with the present invention, an electronic mathematics training device is provided which substantially eliminates or reduces the problems and disadvantages heretofore associated with previously developed mathematics teaching techniques.

In accordance with the present invention, an electronic mathematics trainer includes structure for selectively entering an arithmetic problem to be solved. Circuitry computes the correct answer to the arithmetic problem, in conjunction with at least one incorrect answer to the arithmetic problem. The correct and incorrect answers are displayed. Structure is operable to select one of the displayed answers. Circuitry clears the entered arithmetic problem only upon the selection of the correct displayed answer.

In accordance with another aspect of the invention, an electronic mathematics trainer includes a problem sheet bearing a plurality of arithmetic problems. A display holder is adapted to receive the problem sheet, and contains structure for sequentially indicating ones of the arithmetic problems on the problem sheet to be solved. A keyboard encoder enables the entry of the arithmetic problem indicated on the display holder. A display unit displays the arithmetic problem entered into the encoder. Circuitry computes the correct answer to the arithmetic problem entered by the keyboard encoder, along with an incorrect answer to the arithmetic problem. The correct and incorrect answers are displayed on the display unit. Circuitry is operable for selecting one of the displayed answers. Circuitry in the display holder is responsive to the selection of the correct displayed answer for advancing the indication of the problem to be solved to the next arithmetic problem on the problem sheet. Circuitry clears the arithmetic problem displayed by the display unit upon selection of the correct displayed answer.

In accordance with yet another aspect of the invention, a problem sheet holder is provided for use with a sheet bearing a plurality of arithmetic problems in an electronic mathematics trainer. A base portion receives the sheet containing a plurality of arithmetic problems. Structure is provided to sequentially indicate each problem on the problem sheet. Stucture is provided for retaining the problem sheet within the base portion until all problems on the problem sheet have been indicated.

In accordance with yet another aspect of the invention, a method of teaching arithmetic skills includes displaying a plurality of arithmetic problems to be solved. Decimal numbers and the arithmetic operation of one of the arithmetic problems are then entered into an electronic mathematics trainer. The entered arithmetic problem is displayed to a student without an answer. The correct answer and at least one incorrect answer are computed and displayed. The student selects one of the answers. The correct answer is then displayed on the entered problem upon the selection of the correct answer.

BRIEF DESCRIPTION OF THE DRAWINGS

For a more complete understanding of the present invention and further objects and advantages thereof, reference is now made to the following description taken in conjunction with the following drawings:

FIG. 1 is a front view of the preferred system of the electronic mathematics trainer, including a keyboard encoder and a problem sheet holder;

FIG. 2 is an open side view of a problem sheet holder of the preferred system of the invention;

FIG. 3 is a detailed view of the problem display unit appearing on the front of the keyboard encoder;

DESCRIPTION OF THE PREFERRED EMBODIMENT

Figure 4:
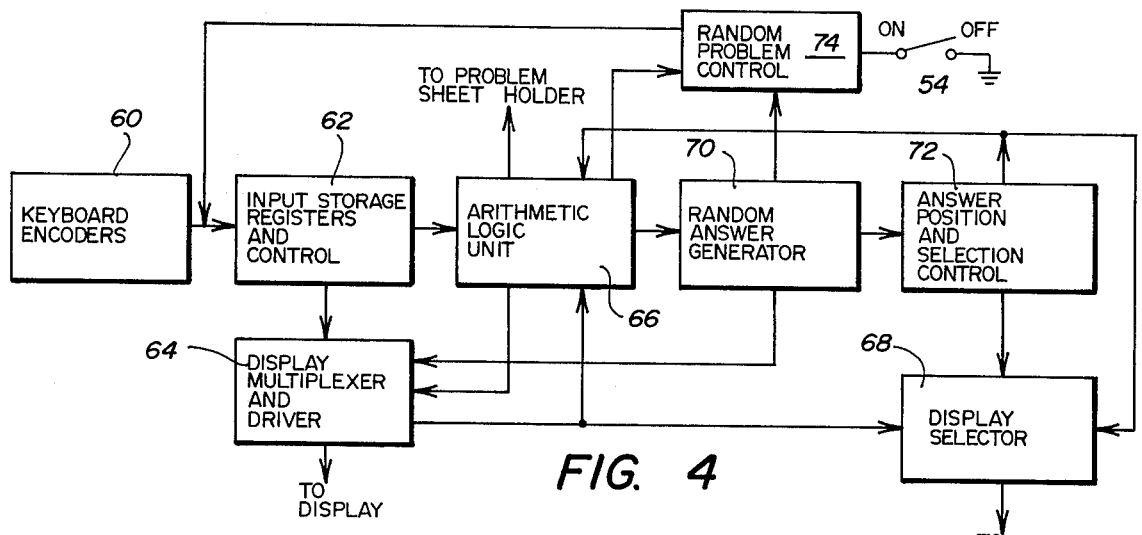
FIG. 4 is a block diagram of the electronic circuitry of the preferred system of the invention.

FIG. 1 illustrates the two basic components which comprise the preferred system 20 of the invention. The two basic components include a problem sheet holder 22 electrically connected by a wire 24 to a keyboard encoder and display 26.

The holder 22 comprises a rectangular housing with a slot formed between an aluminum frame 28 and a plexiglass face plate 30 wherein a translucent or transparent plastic arithmetic problem sheet 32 is inserted. Insertion of the problem sheet 32 trips a locking switch 34, causing a solenoid locking pin 36 to secure the sheet 32 within the holder 22 until a student has successfully answered all the problems.

A plurality of problem lamps 38 are located directly below the face plate 30 in an array of ten rows of ten columns. A problem lamp 38 in the first row of the first column is initially lit to display the first problem on sheet 32. Each time the student selects a correct answer on the keyboard 26, the holder 22 displays the next problem by lighting a next lamp 38 in the array.

The keyboard 26 has a plurality of problem number keys 40 and arithmetic operation keys 42 for encoding the problem displayed on holder 22. The number keys 40 consist of ten pushbuttons for each of the numbers from zero through nine. The arithmetic operation keys 42 consist of four pushbuttons, representing the arithmetic operations of addition, substraction, mulitplication, and division. An operation mode indicator 44 can be selectively positioned above the operation key 42 as a remainder to the student of the type of operation being performed.

A problem display window 46 is located on the face of keyboard 26 and includes seven segment light emitting diodes (LEDs) to display the problem as it is encoded by the student. The decimal digits of the correct answer will be electronically displayed in the proper location in the window display 46 when the student has successfully completed each problem.

A student's entry of a problem into the keyboard 26 enables the electronic circuitry of the invention, as will be subsequently described in detail, to calculate the solution to the problem and to randomly generate two incorrect answers. These three answers are visually displayed to the student in the three windows of a solution display 48. A solution keyboard 50 is located directly below the display 48 on the face of the keyboard 26, so that each of the three pushbuttons and keyboard 50 corresponds to an answer displayed in one of the three windows of display 48.

A student's selection of an incorrect answer from the keyboard 50 will only cause that answer displayed in that window of the solution display 48 to be blanked out. When the student selects the correct answer from the keyboard 50, two things will happen: (1) the correct answer will be displayed in the proper place in display window 46; and (2) a student activated clear bar 52 can now be operated to erase the problem from the display window 46, so the student may go on to enter the next problem from the holder 22.

An automatic random problem control switch 54 is located on the face of keyboard 26 along with the automatic operation mode selector 56. Placing switch 54 in "ON" state eliminates manual control in entering arithmetic problems into the trainer, as problems can now be automatically randomly generated. The operation mode selector 56 enables the student to automatically set the operation mode of automatically randomly generated problems to addition, subtraction, multiplication, division, or randomly selected mode.

FIG. 2 illustrates in greater detail the location of problem sheet 32 in the holder 22. This view clearly shows the open space formed between the cover frame 28 and the face plate 30. The locking switch 34 and its associated pin 36 are located at the top of holder 22, so that the pin 36 is inserted into a hole formed in sheet 32 when the locking switch 34 is tripped.

In operation of the preferred system of the present electronic mathematics trainer, a problem sheet 32, containing an array of multiplication problems, is inserted into the slot formed on the holder 22, thereby tripping switch 34 and locking the sheet 32 in place through the action of the locking pin 36. The problem sheet 32 is now securely located between the cover sheet 28 and the face plate 30, and the sheet 32 will remain locked in holder 22 until the student has correctly answered all the problems.

Assume for this example, that the one problem lamp 38 that is lit illuminates the multiplication problem 3 × 3. The student enters the problem in keyboard 26 by the following steps: depressing the number 3 button of numbered keys 40 for the multiplicand 3, depressing the × key of the arithmetic operation keys 42, and finally by again depressing the number 3 key of number keys 40 for the multiplier 3. The operation mode indicator 44 should now be positioned over the multiplicaton symbol of indicator 44, reminding the student of the arithmetic operation of this problem. The problem 3 × 3 should now be displayed in the problem window 46.

The circuitry in keyboard 26 processes the correct answer 9, along with two randomly chosen incorrect answers, e.g., 6 and 8, and displays these three numbers as possible solutions in the solution display 48. These three answers are shown in an illuminated digital display in each of the three windows of the display 48. An important aspect of the invention is that the correct answer is randomly displayed in different ones of the three windows of display 48.

If the student selects the incorrect answer 6, by depressing the button under this answer on keyboard 50, the machine automatically blanks out this answer, but retains the unanswered problem in the display window 46.

If the student now selects the correct answer by depressing the button on the solution keyboard 50 below the number 9 in a window of display 48, then this correct answer will be displayed in its proper place in the problem display window 46. The machine will also cause the signal to be transmitted through the wire 24 to holder 22, causing the next problem lamp 38 in the array to be illuminated. The student may now blank the problem 3 × 3 from the window 46 by depressing clear bar 52. The machine is now ready for the student to enter the next problem in the same manner as that described above.

The student will advance through this problem solving process until the problems on sheet 32 have been correctly answered, thereby releasing the locking pin 36 for removal of the sheet 32. Upon removal of this problem sheet 32, the student's mathematics training may be continued by insertion of another clear plastic problem sheet 32 into the machine.

In another embodiment of the invention, the keyboard encoder and display may be readily modified to enable a blind student to use the mathematics trainer. The individual keys comprising the number keyboard 40 and the operation keyboard 42 may bear the raised symbols of the Braille alphabet to designate the number of operation encoded by that key. Similarly, the clear bar 52 may have letters in the Braille alphabet embossed on the face of this key to designate its function in the preferred system 20.

The problem display window 46 may include heated elements on the face of keyboard encoder and display 26, suitable for indicating the outline of the digits in the problem on the answer by touching the heated segments of these elements. The use of such heated elements in place of the seven segment light emitting diodes in keyboard encoder and display 26 would raise the power requirements to operate this alternate embodimet of the invention.

A blind student would operate the alternate embodiment of the invention by initially inserting a problem sheet 32 encoded in Braille into the problem sheet holder 22. As in the preferred system 20, the array of problem lamps 38 would sequentially light to indicate to the student the next problem to be keyed into the keyboard encoder and display 26. However, a blind student would be able to detect the correct problem on problem sheet 32 by sensing the heat generated by the subjacent lamp 38. Thus, the translucent plexiglass face plate 30 may be constructed of another material better suited for conducting the heat generated by the problem lamps 38 when it is to be used with keyboard encoder and display 26.

FIG. 3 is a detailed view of the problem display window 46 on the keyboard encoder display 26 (FIG. 1).

The digital displays 130, 131, 132, 133, and 134 comprise the display for the decimal numbers of the arithmetic problem and its selected correct answer. The displays 130–134 may comprise the familiar seven segment light emitting diode displays. In an alternate embodiment of the trainer for a sightless person, heat emitting elements comprising filament wire may replace the light emitting diodes.

The lamp displays 135 and 136 are both illuminated to indicate the division operation, wherein the digital displays 133 and 134 appear as the dividend of the entered problem and digital display 132 appears as the divisor. In the division operation mode the selected correct answer would appear as digital display 131. The lamp display 136 is also illuminated in the addition, subtraction, and multiplication operations to form the bar separating the problem from the answer.

The lamp displays 137, 138, and 139 are illuminated to indicate either the addition (+), subtraction (−), or multiplication (×) operation signs for the entered problem. The operation signs for these three arithmetic operations appear by illuminating these lamp displays. The problem is displayed in digital displays 130 and 131 while the selected correct answer appears in digital displays 133 and 134 below the lamp display 136.

FIG. 4 illustrates the preferred system of the invention in block diagram form. The circuitry described in this diagram is mounted in the keyboard encoder and display 26. A keyboard encoder circuit 60 detects the key depressing action of the student and converts the decimal or operation keys, 40 and 42, into a binary coded digit needed for operation of the machine. This circuit also provides a pulse signal to indicate that a key has been pressed and that data is available.

The data received from the keyboard encoder 60 is received by an input storage register and control circuit 62, which routes this data to a series of storage registers. Here the information is maintained for use by both a display multiplexer and driver circuit 64 and an arithmetic unit 66. The information to be operated on is retained in these registers until a correct answer is selected by the student. The register retains the information of the operation mode selected to allow that operation to continue and set the machine up for the next problem.

The arithmetic logic unti 66 processes the information stored in the registers of unit 62 and processes it to derive an answer, if one is possible. The unit 66 only accepts as a valid problem positive integar operations. An invalid problem will cause unit 66 to reset, making it ready for a valid problem. This unit 66 uses a method commonly known as serial decimal mathematics to carry out the operations of addition, subtraction, multiplication and division. Addition is accomplished by incrementing an output register as a companion register is decremented to zero. Subtraction operates similarly, except both registers are decremented. Multiplication is accomplished by successive addition, and division is executed by successive subtraction.

The display multiplexer and driver 64 selects the outputs from all the storage registers in the machine and makes them available to the display decoder and drivers. In order to prevent confusion in the mind of the student, this process incidentally includes blanking and zero display suppression of undesired digits. The unit 66 further provides lamp drivers for the display of the operation mode on the keyboard encoder and display 26. The unit 64 also alerts the arithmetic logic unit 66 and a display selector unit 68 to specially set up for the division operation.

A random answer generator unit 70 compares the true answers of the problem computed by the unit 66 with randomly generated numbers to be presented as alternate choices to the student. These numbers generated in this fashion are stored in four registers for use by the display multiplexer and driver unit 64.

An answer position selection control unit 72 selects the order in which the correct answer and two incorrect answers are placed in solution display 48. A student selection of a correct answer enables the unit 72 to instruct the display selector 68 to place the correct answer in the proper position in the problem display window 46. If the student selects an incorrect answer, this unit 72 will blank out the incorrect answer in the solution display 48.

A random problem control unit 74 may be switched on to generate random problems for automatic entry into the input storage unit 62 for solution by the trainer. The control unit 74 enables the student to select the operation mode for the automatically entered problems to be predetermined as one of the four arithmetic operations or to be randomly generated arithmetic operation.

The display selector unit 68 enables the machine to select which one of the machine's eleven displays shall be energized to display the information placed on the display drive lines by the display multiplexer and driver unit 64. The format for displaying this information is governed by the operation selected by the student as well as the student's progress in solving a problem.

Figure 5:
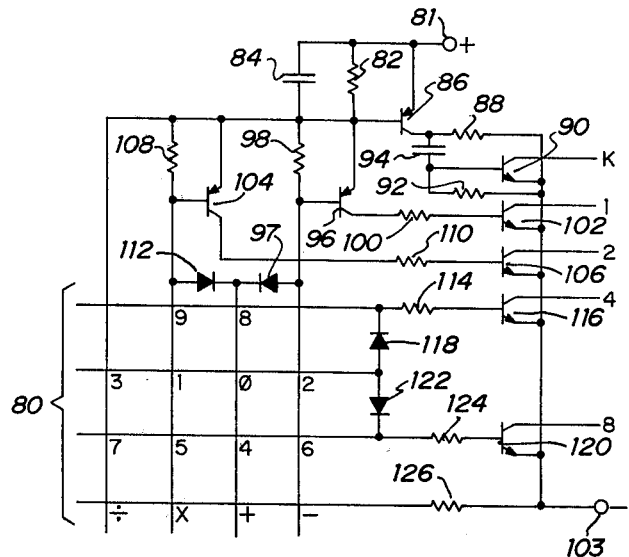
FIG. 5 is a schematic diagram of the keyboard encoder of the preferred system.

FIG. 5 illustrates a schematic diagram of the keyboard encoder 60 (FIG. 4) that converts the student's action of depressing a decimal or operation key into a binary type code utilized by the system 20. This circuit also provides a pulse signal to the other circuits, indicating that data is now available.

A 16 position matrix 80 has 14 places in a rectangular array of intersections of input and output leads that correspond to the 14 pushbuttons on the faces of keyboard 26. As is indicated in the matrix 80, these intersections correspond to the decimals zero through nine and the symbols for the four arithmetic operations of division, multiplication, addition and subtraction.

At the same time a student depresses a decimal key 40 or an operation key 42 shorting a point on the matrix 80, current is allowed to flow from a positive power terminal 81 through resistor 82, thereby enabling capacitor 84 to charge and forward bias a PNP transistor 86. The collector of transistor 86 is connected through resistor 88 to the ground lead 103. The base of transistor 90 is connected to both a biasing resistor 92 and a capacitor 94 which couple transistor 90 to the collector of transistor 86. The capacitor 94 forces transistor 90 on for a short period of time, thereby providing a direct output pulse through its collector to indicate that data is present.

A PNP transistor 96 has its emitter connected through the charging circuit of resistor 82 and capacitor 84 to the positive power terminal 81, while its base is connected to the charging circuit through a resistor 98. The collector of transistor 96 is connected to resistor 100 to the base of an NPN transistor 102, which has its emitter connected to a negative power terminal 103. The base of transistor 96 is further connected to two vertical branches in the matrix 80. One of these branches is connected through diode 97 while the other branch is connected directly to the base of the transistor 96. Thus, as different points in the two branches are shorted, transistor 96 is forced into conduction and is in turn forcing transistor 102 to conduct, thereby changing the output at the collector of transistor 102 from a logic high level to a low level.

Another PNP transistor 104 is similarly connected to two branches of the matrix 80 in order to cause the collector of an NPN transitor 106 to conduct, thereby changing its output from a high level to a low level. The transistor 104 also has its emitter connected to the charging circuit of resistor 82 and capacitor 84, and the base of transistor 104 is connected with resistor 108 to the same circuit. The collector of transistor 104 is connected through resistor 110 to the base of the transistor 106, which has its emitter tied to a negative power source. The base of transistor 104 is connected to the center two vertical branches of the matrix 80, one of these connections is made through diode 112, which has its cathode connected to both the cathode of diode 102 and the second vertical branch of the matrix 80. Thus, as any of the eight points on these two branches are shorted, the transistor 104 is forced into conduction, thereby forcing the transistor 106 to conduct and placing a logic low level output on its collector attached to pin 2.

The top horizontal lead in the matrix 80 is connected through resistor 114 to the base of an NPN transistor 116. The second horizontal lead from the top is connected through diode 118 through the resistor 114 to the base of transistor 116, having its emitter connected to a negative power source. Thus, depressing any of the six keys corresponding to different points on the matrix 80 crossed by the two horizontal leads forces the transistor 116 to conduct, placing a logic low level at its collector terminal tied to the output pin 4.

Similarly, the second and third horizontal leads counting from the top of matrix 80, are connected to the base of an NPN transistor 120. The second horizontal lead is connected through a diode 122 and a resistor 124 to the base of transistor 120. The third horizontal lead is connected directly through the resistor 124 to the base of transistor 120, which has its emitter tied to negative terminal 103. The bottom horizontal lead in the matrix 80 is connected through limiting resistor 126 directly to the negative power source. Thus, a student's action of depressing any of the keys corresponding to the decimal associated with the second and third horizontal leads to the matrix 80 causes the transistor 120 to conduct, thereby placing a logic low level signal at its collector which is tied to the pin 8.

Table I is included below to show the binary coded information signal generated for each of the decimal and operation keys 40 and 42 that may be activated by a student.

TABLE I

TABLE OF OUTPUTS

| KEY | K | 1 | 2 | 4 | 8 |
|---|---|---|---|---|---|
| NONE | 1 | 1 | 1 | 1 | 1 |
| 1 | C | 1 | 0 | 0 | 0 |
| 2 | C | 0 | 1 | 0 | 0 |
| 3 | C | 1 | 1 | 0 | 0 |
| 4 | C | 0 | 0 | 1 | 0 |
| 5 | C | 1 | 0 | 1 | 0 |
| 6 | C | 0 | 1 | 1 | 0 |
| 7 | C | 1 | 1 | 1 | 0 |
| 8 | C | 0 | 0 | 0 | 1 |
| 9 | C | 1 | 0 | 0 | 1 |
| 0 | C | 0 | 0 | 0 | 0 |
| + | C | 0 | 0 | 1 | 1 |
| × | C | 1 | 0 | 1 | 1 |
| − | C | 0 | 1 | 1 | 1 |
| ÷ | C | 1 | 1 | 1 | 1 |

Figure 6:
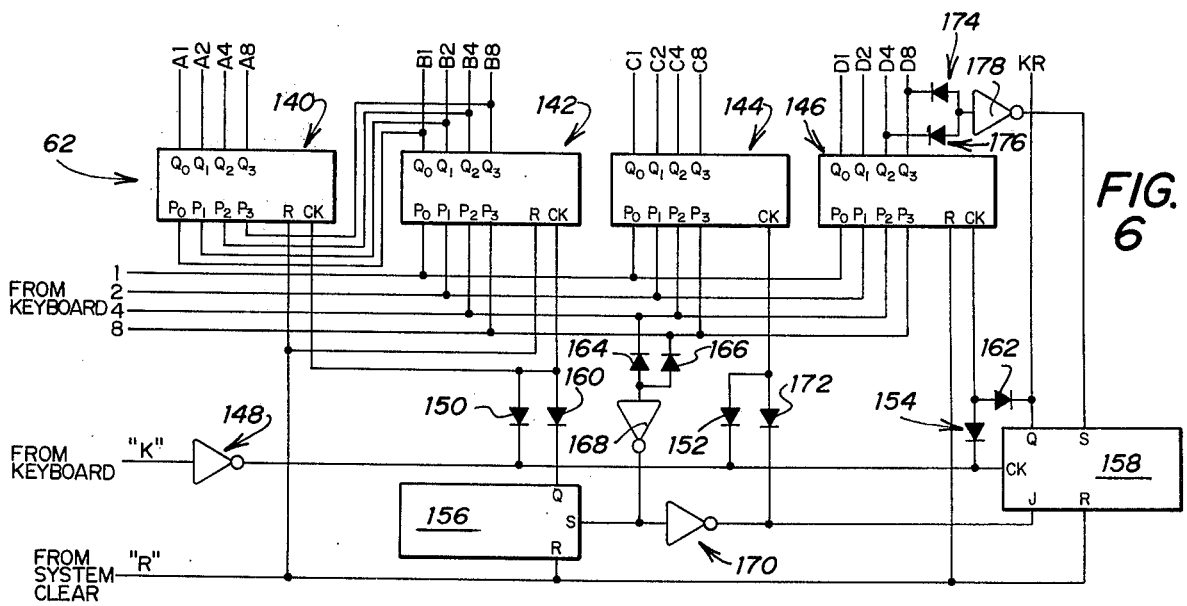
FIG. 6 is a schematic diagram of the input storage register and control of the invention.

FIG. 6 illustrates a schematic diagram of the input storage registers and control 62 (FIG. 4) that routes that data from the keyboard to a storage area, where it is maintained for later use by the display and mathematics systems of the preferred system 20. At the conclusion of each problem, all the information except the selected operation mode is cleared from each storage area for further problem solving. This allows the machine to set its displays up to continue the operation selected when other problems are encoded by a student.

A total of four storage registers, 140, 142, 144 and 146, are included to receive the binary coded signals generated by the student depressing decimal and operation keys in the matrix 80 (described above). Storage registers 140–146 may comprimise for example, Ser. No. 74195 storage registers. The low going pulse signal placed on output pin k by the action of depressing a key in the matrix 80 is inverted by an inverter 148 and fed to each of the Ck leads of the storage resistors 140, 142, 144 and 146. The "data present" signal is transmitted through diode 150 to the Ck leads of storage registers 140 and 142. Similarly, diode 152 and 154 transmit this signal to the Ck lead of storage registers 144 and 146, respectively. This now enables the information present to be loaded into one of the desired storage registers 140, 142, 144 and 146.

A reset pulse may be applied to the R terminal of storage registers 140, 142 and 146 to clear all information previously stored in these registers. As described above, the operation mode selected, stored in register 144, is retained to set the preferred system 20 of the invention for the next operation. The reset pulse from pin R is also applied to the R terminals of the control flip-flops 156 and 158, placing them in their starting positions. The starting position of the control flip-flop 156 enables the storage register 142 to load information as it becomes available by transmitting a signal from the Q output terminal of control flip-flop 156 through diode 160 to the Ck lead of the register 142. Similarly, the starting position of the control flip-flop 158 operates to prevent register 146 from loading information by transmitting a signal from the Q output terminal of flip-flop 158 through the diode 162 to the Ck terminal of register 146.

Setting storage register 142 in its starting position enables binary coded decimal digits to be placed in the register 142 through its input terminals. Since the output terminals of register 142 are clocked in parallel to the input terminals of the register 140, the reception of a signal indicating a second successive binary coded decimal digit places this information in the storage register 142 and passes the first information to the storage register 140. This process of passing information from storage register 142 to register 140 will continue until the binary coded information signal from the matrix 80 indicates an operation mode is selected.

The selection of an operation mode is detected by diodes 164 and 166, enabling a signal to pass through the inverter 168 and transmitting a signal to the S terminal of the flip-flop 156 which disables registers 140 and 142. This signal is also transmitted through the inverter 170 through a diode 172 to the Ck lead of the operations storage register 144. This allows the binary coded operation signal to be stored in the register 144. The signal from inverter 170 is also transmitted to the J terminal of flip-flop 158, enabling the storage register 146 to receive data by setting on the falling edge of the information signal from the matrix 80.

The output signal from the storage register 146 is monitored by diodes 174 and 176 to prevent an operation code from being entered in this register 146. If the diodes 174 and 176 detect a logic level indicating a control code, a signal is transmitted through inverter 178 to the S terminal of the flip-flop 158, resetting it to allow another binary coded information signal to be received. This new or second control code is now the operation mode stored in the operation storage register 144, thereby enabling the student to correct an erroneous entry. Upon entry of a BCD signal for a decimal digit into register 146, the output at terminal Q of the flip-flop 158 goes low, indicating on the KR pin that all information necessary for the operation of the problem is now present. The output of all four registers is made available to other circuits of the preferred system of the invention.

Figure 7:
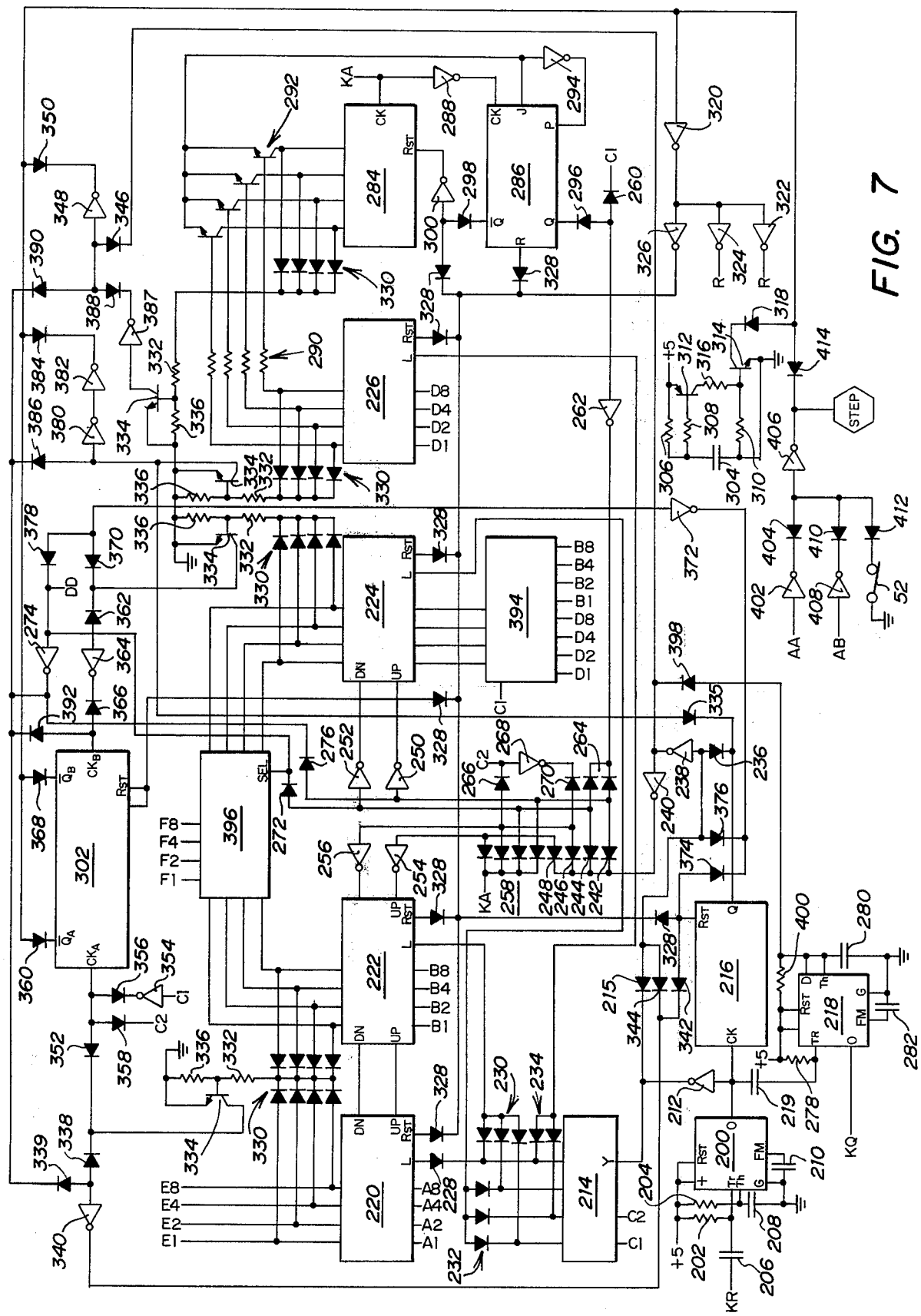
FIG. 7 is a schematic diagram of the arithmetic logic unit of the invention.

FIG. 7 illustrates a schematic diagram of the arithmetic logic unit 66 (FIG. 4) that takes the information stored in the input storage registers and controls 62 (FIG. 4) and processes it to derive an answer, if one is possible.

A timer 200 has two of its input terminals, + and Rst, connected directly to a positive voltage source, which source is also connected through resistor 202 to the Tr terminal and through resistor 204 to the Th terminal of the timer 200. A "data is ready" signal is applied as a low level pulse to the Kr pin through capacitor 206 to the Tr terminal of the timer 200. The timer 200 is connected directly to ground through its terminal G, while terminals Th and Fm are connected to ground through capacitors 208 and 210 respectively. A timer 200 could consist of an integrated circuit type NE 555.

A pulse generated at the output terminal 0 of the timer 200 is applied through an inverter 212 to the following three components: Y input terminal of a decimal decoder 214 and to a diode 215, the Ck terminal of a control flip-flop 216, and the Tr terminal of a second timer 218 through a capacitor 219. The location of each of the three circuit components in relation to other elements of the circuit is described below.

First, the decimal decoder 214 acts as a four-position switch to load the binary coded decimal digits placed at the input terminals $P_0$–$P_3$ of the decade counters 220, 222, 224, and 226. The decade counters 220–226 may consist of, for example, four TTL decade counters of the type 74192. The decade counter 220 is connected through diode 228 from an output terminal of the decoder 214. A plurality of diodes 230 connect output terminals of decoder 214 to the load terminal decade counter 222. Similarly, a plurality of diodes 232 and 234 connect output terminals of decoder 214 to the decade counters 224 and 226, respectively. Finally, the signal from the diode 215 is fed to the counter control circuitry operating through an inverter 238, described below.

Secondly, the pulse generated at the output terminal of the timer 200 is applied to the control flip-flop 216, thereby setting the output at terminal Q of the flip-flop 216. The control flip-flop 216 may consist of, for example, one-half of a TTL dual flip-flop of the type 7476. The output from terminal Q of flip-flop 216 is applied through diode 236, inverter 238, and a second inverter 240 to a plurality of diodes 242, 244, 246, and 248. Diodes 242 and 244 enable the flip-flop 216 to set decade counter 224 through an inverter 250 to count up or through an inverter 252 to count down. Similarly, diodes 246 and 248 enable flip-flop 216 to set decade counter 222 through an inverter 254 to count up or through an inverter 256 to count down. A plurality of diodes 258 feed a clock pulse KA to each of the inverters 250, 252, 254 and 256, described above.

Decade counters 222 and 224 also receive information as to the operation mode selected. Cl, the least significant digit in the binary code for the operation selected, is applied through a diode 260 through an inverter 262 to a pair of diodes 264 connected to the inverters 250 and 252 of decade counter 224. C2, the signal for the next least significant binary digit in the operation mode selected, is applied through a diode 266 to inverter 256 of decade counter 222. The same signal is applied through an inverter 268 through diode 270 to the same inverter 256. There is one last information signal DD, generated by the display multiplexer and driver unit 64 (FIG. 4), which alerts the arithmetic logic unit 66 to the selection of the division operation. The DD signal is applied through a diode 272 to the inverter 252 attached to the "count down" terminal of the decade counter 224. This same signal DD is also applied through an inverter 274, through a diode 276, and then to the inverter 250 attached to the "count up" terminal of the decade counter 224.

Third and finally, the timer 218 has its + terminal attached directly to a positive voltage source, which also is connected to the Tr terminal through a resistor 278. The Th terminal and the Fm terminal of the timer 218 are connected through their respective capacitors 280 and 282 to a ground, which is also connected to the G terminal of timer 218.

A fifth decade counter 284, a control flip-flop 286 and the decade counter 226 form the basic components of a counter circuit used by the machine in multiplication and division problems. The flip-flop 286 may consist of one-half a TTL dual flip-flop of the type 7476, while the decade counter 284 may consist of a TTL decade counter type 7490. The clock pulse KA is applied to the Ck terminal of the counter 284, and it is applied through an inverter 288 to the Ck terminal of the control flip-flop 286. The output terminals of the counter 226 are connected through a plurality of resistors 290 to the base terminals of a plurality of NPN transistors 292, which have their collectors connected to the corresponding output terminals of the counters 284. The emitters of transistors 292 are connected in parallel to the J terminal of flip-flop 286, and they are also connected through an inverter 294 to the P terminal of this flip-flop 286. The output signal at the Q terminal of the flip-flop 286 is applied through a diode 296 to decade counter 224 through the circuitry operating through the inverter 262. A complement of this output signal is applied at the $\overline{Q}$ output terminal of the flip-flop 286 through a diode 298 and an inverter 300 to the Rst terminal of the counter 284.

A reset signal is applied to all counters, 220, 222, 224, 226 and 284, and all flip-flops, 216, 286, and 302 (described below), upon the initial application of power to the machine. A slow charging capacitor 304 is connected through resistor 306 to a positive voltage source from which the power is supplied to the arithmetic logic unit 66 (FIG. 3). Capacitor 304 is coupled through resistors 308 and 310 to the base terminals of a PNP transistor 312 and an NPN transistor 314, respectively. The emitter of transistor 312 is connected to the positive voltage source, while the emitter of the transistor 314 is connected to ground. A resistor 316 tied the collector of the transistor 312 to the base of the transistor 314. A diode 318 applies this reset signal through an inverter 320 to a pair of parallel inverters 322 and 324 where it is applied to the circuits that follow. From inverter 320, this reset signal is also fed to an inverter 326 where it is applied to a plurality of diodes 328 connected to the respective reset terminals of the decade counters 220, 222, 224, 226, and 284 and the flip-flops 216, 286, and 302.

The four output terminals of all five counters 220, 222, 224, 226, and 284 are connected to a circuit for detecting a 0000 output, which circuit is comprised as follows: a plurality of diodes 330 connecting the signal from the output terminals through resistor 332 to the base of an NPN transistor 334, having its emitter connected to ground and its base connected through resistor 336 to ground.

This zero-detecting transistor 334 for both the decade counters 220 and 222, connected in cascade, has the signal from its collector applied through diode 338 to an inverter 340 which feeds the signal to a pair of diodes 342 and 344. The signal through diode 342 is applied to the reset terminal of the flip-flop 216, while the signal through diode 344 is applied through inverter 238 through diode 346, inverter 348, and diode 350 to the reset circuitry of the arithmetic logic unit 66, operating through the inverter 320. The DD division signal is fed through the inverter 274 and diode 339 to this same circuitry operating through inverter 340.

The signal from the collector of transistor 334 is also applied through diode 352 to the Cka lead of the dual flip-flop 302. The Cka lead of the flip-flop 302 also receives the input signal from C1 and C2, the two least significant binary coded digits in the operation signal. Signal C1 is transmitted through an inverter 354 to a diode 356, while the C2 signal is transmitted through a diode 358. When the information applied at the Cka lead toggles the flip-flop 302, the output signal at the $\overline{Q}_a$ terminal is applied through a diode 360 directly to the reset circuitry operating through the inverter 320 and described above.

The collector of transistor 334 for the decade counter 224 is connected through diode 362 to an inverter 364 to a second diode 366, which transmits the signal to the Ckb lead of the flip-flop 302. As described above for the output at $\overline{Q}_a$ terminal of the flip-flop 302, an input signal at the Ckb lead that toggles an output signal at the $\overline{Q}_b$ terminal of the flip-flop 302 is fed through diode 368 to the reset circuitry operating through the inverter 320. The signal from the collector of the transistor 334 of this counter 224 is also applied through a diode 370 through an inverter 372 to a pair of diodes 374 and 376. The signal through diodes 374 is fed to the reset terminal of the flip-flop 216, while the signal through diodes 376 is fed through the circuitry operating through the inverter 238 (described above).

The circuitry operating through the inverter 372 just described also receives a signal through a diode 378 when the DD signal indicates a division problem is present.

The signal from the collector transistor 334 for the next decade counter 226, is fed through a pair of series connected inverters 380 and 382 through diodes 384 to the reset circuitry, operating through the inverter 320. As in the description above, the presence of a DD signal for a division problem is similarly fed through the circuit operating through the inverter 380, since the DD signal is fed through the inverter 274 to a diode 386 connected to inverter 380. The signal from the collector of counter 226's transistor 334 is applied through a diode 335 to the circuitry operated by flip-flop 216.

The final zero detection transistor 334 for the fifth counter 284 has its collector connected through an inverter 387 to a diode 388 through inverter 348 and diode 350 to the reset circuitry of the arithmetic logic unit, operating through inverter 320. Again, in this case, the reset circuitry operating through inverter 348 also receives the DD signal indicating division, which is transmitted through the inverter 274 to a diode 390. Finally, a DD signal is also transmitted through a diode 392 to the Ckb terminal of flip-flop 302.

A selector switch 394 operates to select one of two binary coded input signals and places it on its output terminals to be transmitted to the decade counter 224. The operation of selector switch 394 is controlled by the C1 operation mode signal, indicating by high level the selection of either multiplication or division.

A second selector switch 396 is controlled by a DD signal indicating division to route either the output signal from decade counter 224 or the output signal from decade counter 222 to a set of four output terminals containing the binary coded information signal for the least significant digit of the answer, represented by the letter F.

When the clock pulses from flip-flop 216 have ceased, there is no longer a signal at inverter 238, thus allowing timer 218 to time out from a signal through diode 398. The signal from diode 398 is received by the timer 218 directly at its input terminals D and Th. It is connected to the reset terminal through resistor 400. The timer 218 now has an output signal KQ at its output terminal indicating to the following circuits that a valid answer is now available.

If a valid answer has been selected, then input signal AA is transmitted through an inverter 402 and a diode 404 to an inverter 406, and the input signal AB is transmitted through an inverter 408 through a diode 410 to the inverter 406. Depressing clear switch 52, normally grounded, pulses a signal through diode 412 to the inverter 406 to step a problem lamp 38 in the holder 22, and to reset the circuits of the arithmetic logic unit 66 through a diode 414 connected to the circuitry of the inverter 320.

In operation of the arithmetic logic unit 66, the application of power initially causes the slow charging capacitor 304, acting through transistors 312 and 314 to place a low level at the inverter 320 thereby operating the reset lines of the machine through inverters 322, 324, and 326. A plurality of diodes 328 apply the reset signal to the terminals of the respective counters, 220–226, and flip-flops, 216, 286 and 302.

Arithmetic logic unit 66 begins to perform the problem present in counters 220, 222, 224 and 226 when the low level KR pulse from the input storage unit 62 is received by the timer 200.

A two position selector switch 394 makes D output of unit 62's register 146 available to counter 224 if an add or subtract problem has been entered, or the B output of unit 62's register 142 if a divide or multiply problem has been entered. The counter 220 has the A output of unit 62's register 140 available, counter 222 — B, and counter 226 — D. The operation mode selected was stored in the C register 144 of unit 62. The corresponding C1 and C2 leads as well as the DD division signal has preset the arithmetic logic unit 66 for operation.

A pulse from the timer 200 instructs the decoder 214 to route the data from the storage registers 140–146 of unit 62 through diodes 230, 232, and 234 to the appropriate counters 220, 222, 224, and 226 for the operation selected. This same pulse also sets the flip-flop 216 to enable the successive adding or subtracting to take place in the counters 220–226. Also the timer 218 is also set, but diode 398 prevents it from timing out until the counting has been completed. The falling edge of the signal KQ of the timer 218 indicates to other circuits of the machine that the arithmetic logic unit 66 has completed the answer for the problem.

The operation of the elements of arithmetic logic unit 66 can best be illustrated by considering some typical math problems for solution. Upon keying the problem 3 + 4, the 3 is placed in the B register 142, the plus (+) in the C register 144, and the 4 in the D register 146 of the input storage register unit 62 (FIG. 4). The load command from the timer 200 through the decoder 214 loads the 3 into counter 222 and the 4 into counter 224. The flip-flop 216 allows the clock pulse, KA to cause decade counter 222 to count upward, while at the same time counter 224 is forced to count down. When counter 224 reaches zero, the transistor 334 for counter 224 through inverter 372 forces the flip-flop 216 to stop the clock pulse KA to counter 224. Since decade counter 224 has been clocked four times to reach zero, counter 222 has also received four clock pulses, which in addition to the 3 preset in the counter 222 causes it to now rest at 7. The lack of a signal at the output of inverter 238 allows the timer 218 to time out, indicating through its output signal KQ that a valid answer is now available.

In all operations except the division, the output of decade counter 222 is the F signal from the selectors switch 396. In division, switch 396 allows the decade counter 224 to provide the output signal F.

In subtraction the same process occurs as that described above for addition, except counter 222 counts down instead of up. In order to prevent subtraction that results in negative answer, if counter 222 reaches zero and steps back to 9, the flip-flop 302 will toggle causing the signal at the QA terminal to operate the reset circuitry resetting the machine through the invertor 320.

A divide by n counter is formed by the following components: counter 226; counter 284; transistors 292; inverters 288, 294 and 300; and diode 298. This means that the output signal at the Q terminal of flip-flop 292 will only pulse once per each n, n being the value set in the counter 226. This n counter is used in only multiplication and division to increment or decrement the counter 224 at a/nth of the angular clock pulse speed KA.

Arithmetic logic unit 62 multiplies and divides by a method called serial decimal math, that is by successive addition and successive subtraction, respectively. To illustrate the operation of these two arithmetic operations, assume the problem 3 × 5 has been keyed into the input storage register unit 62 (FIG. 4). The 3 is loaded into counter 224 and the 5 into counter 226. Control flip-flop 216 is set so that counter 222 is clocked upward as counter 284 is clocked. When counter 284 reaches 5, a pulse is applied to counter 224 to count it down, resetting counter 284. Counter 284 counts another five pulses and again pulses counter 224 down once more, resetting counter 284 again. Counter 284 repeats counting five pulses and this time it forces counter 224 to zero, which is detected by its zero detector transistor 334, stopping control flip-flop 216. Counter 222 has seen 15 pulses during this sequence and has stopped at 5 since it can hold only 9. But, since counter 224 is cascaded to counter 220 which has registered a 1, indicating 10, the output of the two registers can be displayed through output signals E and F as 15.

The operation for division is similar, but because of the important differences this operation will also be illustrated by an example. The dividend (which may be two places) is entered into counters 220 and 222, while the divisor is entered into counter 226. The clock pulse KA subtracts the divisor in counter 226 from the dividend in counter 220 and 222 until they register zero. Each time counter 284 is reset, counter 224 is counted up one place. When counters 220 and 222 equals zero, the zero detector transistor 334 for the counter 284 checks the position of this counter 284, resetting the machine through the circuitry of inverter 320 if the counter has not reached zero, indicating the problem was fractional. If counter 284 has reached zero, the answer is an integer and valid.

There are several special features of the arithmetic logic unit 66 to detect certain problems. If the multiplier to be loaded in decade counter 226 is zero, the clock is not permitted to run and the answer will always appear at zero. If zeros are entered into counter 226 for a division problem, the inverters 380 and 382 will operate the reset circuitry of the machine through inverter 320, as division by zero is not permitted. The control flip-flop 302 with its output at terminal $\overline{QB}$ prevents counter 224 from exceeding 9 on division, since the machine makes no provisions for an answer greater than 9. Thus the machine is reset if a problem such as 20 ÷ 2 is attempted.

The receipt of a problem and the selection of a correct answer enables the student to depress clear bar switch 52 to step the problem on the problem sheet holder 22 and also reset the circuitry of arithmetic logic unit 66.

Figure 8:
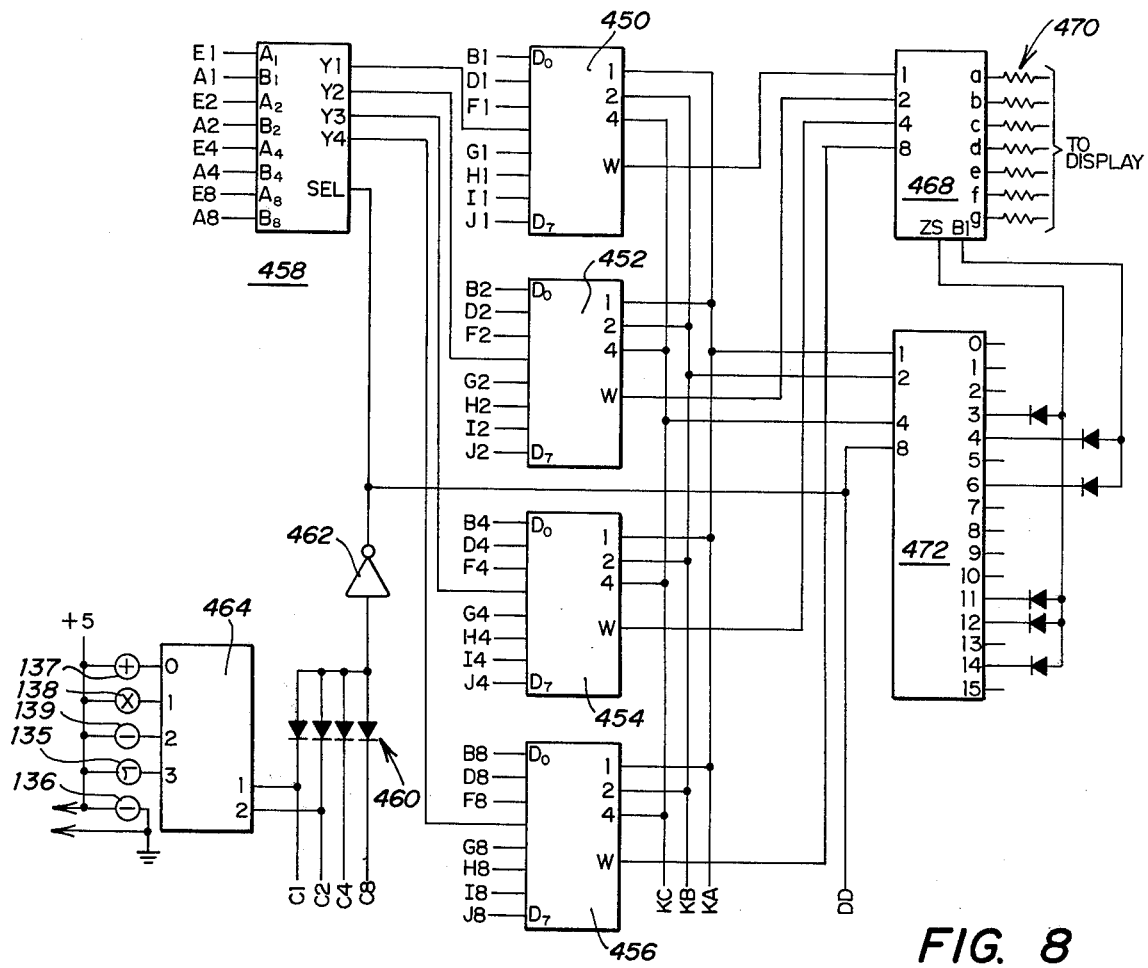
FIG. 8 is a schematic diagram of the display multiplexers and drivers of the invention.

FIG. 8 illustrates a schematic diagram of the display multiplexers and drivers 64 (FIG. 4) that selects the data outputs of all the registers and the counters in the machine, making them available for display.

A plurality of data selector switches 450, 452, 454 and 456 has seven of their eight input positions connected directly to storage registers or counters in other circuits of the machine. These switches 450–456 may consist of the 74152 type TTL eight line to one line selectors. The fourth position of each switch 450–456 is determined by one of the two outputs of data selector 458. The eight input positions available to the data selector 458 come from the 4 bit binary coded outputs of either storage register 140 (FIG. 5) on the counter 220 (FIG. 6).

A plurality of diodes 460 detect the presence of the division mode and through inverter 462 operate the selector of the data selector switch 458. The signal from the inverter 462 is applied to other circuits of the machine as the DD signal, setting up those circuits for the division operation.

The C1 and C2 binary coded signals of the operation code are applied to the input terminals of a decoder 464 to selectively operate a plurality of format lamps 466 for the operations division, addition, subtraction and multiplication. The decoder 464 may comprise a 7442 type TTL BCD to decimal decoder.

A decoder and driver 468 has each of its four input terminals connected to an output terminal W of one of the data selector switches 450–456. The seven output terminals, $a$–$g$, of the decoder and driver 468 are connected through a plurality of resistors 470 to the 11 seven-segment light emitting diode displays of the machine. The decoder 468 may comprise, e.g. 7447 type TTL seven-segment decoder driver.

A 16 position decoder 472 has three of its input terminals connected to the three binary clock signals KA, KB, and KC. The fourth input terminal receives the signal from the inverter 462, which indicates the selection of the division mode. A plurality of diodes 474 connect selected output terminals of the decoder and display 472 to the ZS and B1 control terminals of the decoder and driver 468, thereby blanking it in certain divide displays and suppressing zeros in 10 positions of two digit answers. The decoder 472 may comprise, e.g., a 74154 type TTL four line to 16 line decoder type.

In the operation of the display multiplexers and drivers unit 64 (FIG. 4) the operation mode signal, C, is decoded by decoder and display element 464, thereby allowing the correct operation format lamps 466 to be illuminated in the display window 46 of the keyboard encoder and display 26 (FIG. 1).

A data selector switch 458 is conditioned by the division operation signal to place the binary coded input from the E register of the arithmetic logic unit 66 (FIG. 3). In all other operation modes, the data output from the A storage register 140 (FIG. 5) is made available to the data selector switches 450–456.

The eight positions on the selector switches 450–456 are sequentially made available for display through the decoder and driver 468 by a series of three clock pulses, KA, KB and KC. There are 11 digital displays (DS1–DS111) in the keyboard encoder and display 26 (FIG. 1), five in the problem display window 46 and two each in the three windows solution display 48.

Figure 9:
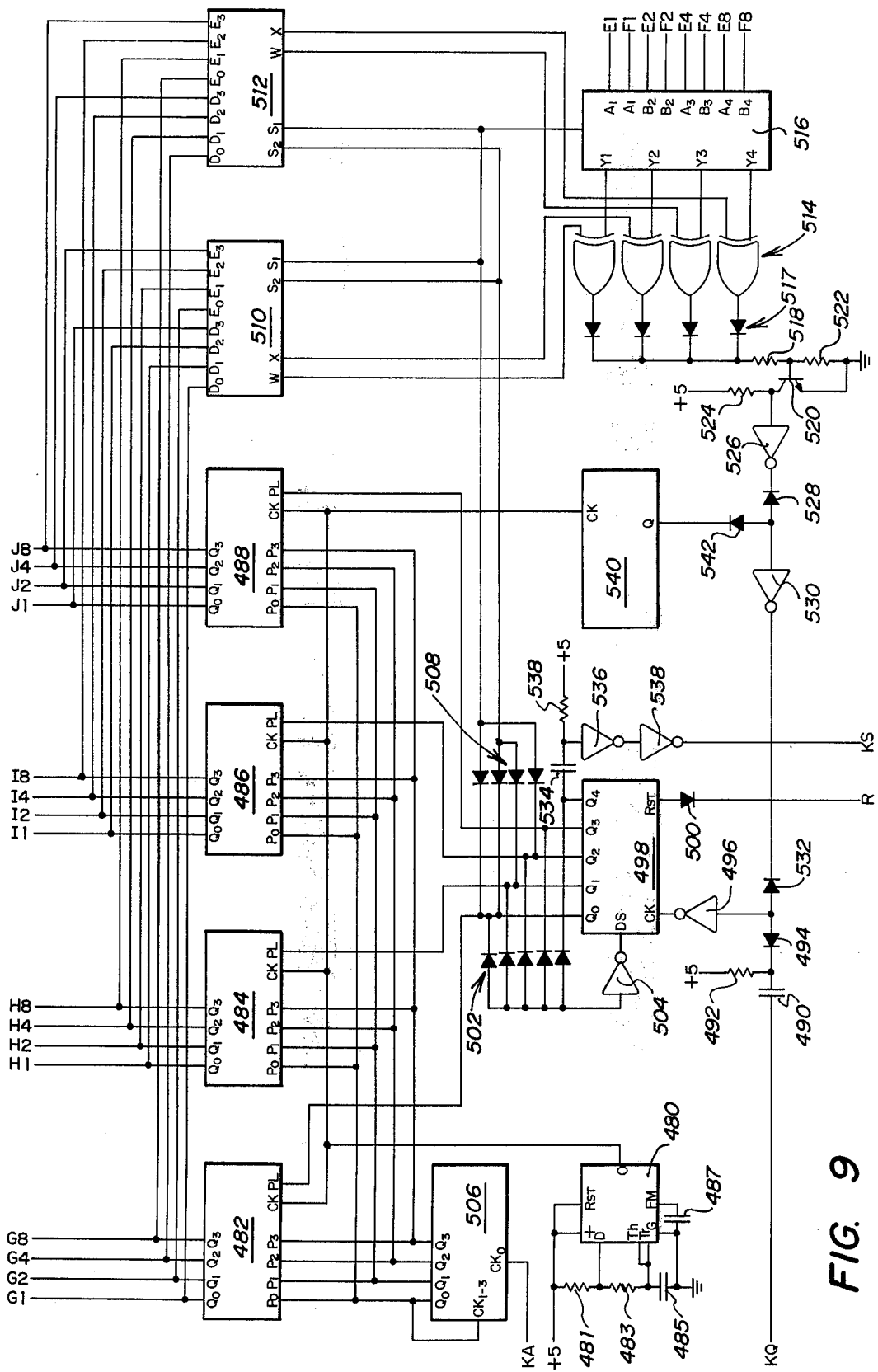
FIG. 9 is a schematic diagram of the random answer generator of the invention.

FIG. 9 illustrates a schematic diagram for the random answer generating unit 70 (FIG. 4), which takes the true answer of the problem as a basis to randomly generate two dissimilar numbers to be presented to the student as possible answers.

A free running oscillator 480 pulses the CK lead of a plurality of shift registers 482, 484, 486, and 488. The oscillator 480 may comprise, e.g., an NE 555 IC type timer, while registers 482–488 may comprise 4 bit TTL 74195 type shift registers. The oscillator 480 has its + and Rst terminals connected directly to a positive voltage source, while its D input terminal is connected through a resistor 481. Terminal D is also connected to ground through a resistor 483 and a capacitor 485. Terminals Th and Tr of oscillator 480 are coupled through the capacitor 485 to a common ground. Finally, the oscillator 480 has its FM terminal connected through a capacitor 487 to ground, while its Gnd terminal is connected directly to ground.

The KQ signal from the arithmetic logic unit 66, indicating the presence of a valid answer, is connected through a capacitor 490 and a pull-up resistor 492, through a diode 494 to an inverter 496 connected to the Ck lead of a shift register 498. The shift register 498 may comprise, for example, a TTL 5 bit shift register type 7496. The register 498 is reset by the reset circuitry of the machine through a diode 500.

The shift register 498 is set up with a plurality of diodes 502 connecting its output terminals through an inverter 504 to the DS terminal of the register 498, thereby functioning as a ring counter.

A decade counter 506 is pulsed by the binary clock signal KA to constantly make its binary code decimal digit available to the inputs of the four registers 482–488. The counter 506 may comprise, e.g., a TTL 7490 type decade counter. A plurality of diodes 508 enables the shift register 498 to cause data selectors 510 and 512 to successively connect outputs of storage registers 482–488 to one side of a set of exclusive OR gates 514. Data selectors 510 and 512 may comprise, e.g., two TTL dual 74153 type four line to one line selectors, while OR gates 514 may comprise four TTL quad type exclusive OR gates.

A selector switch 516, controlled by the shift register 498, places the appropriate binary coded decimal digits of the answer at the other side of the exclusive OR gates 514. Selector switch 516 may comprise, e.g., a TTL quad two line to one line type 74157 selector. A plurality of diodes 517 takes the output of each of the exclusive OR gates 514 and applies it through a resistor 518 to the base of an NPN transistor 520. The transistor 520 has its emitter connected to the ground, and its base grounded through the resistor 522. The collector of the transistor 520 is connected to a pull-up resistor 524 as well as to the Ck lead of the shift register 498 through inverter 526, a diode 528, an inverter 530, a diode 532, and the inverter 496. A flip-flop 540 is provided to apply pulses at one-half the loading rate into registers 482–488 through diode 542 to inverter 530. This causes the registers 482–488 to make at least two changes before the exclusive OR gates 514 operate on a number presented at its input terminals.

The final position, Q4, of shift register 498 is coupled by a capacitor 534 to an inverter 536, which also has its input connected to pull-up a resistor 538. The signal from inverter 536 is itself applied to an inverter 537 which has an output pulse KS, indicating that this circuit has completed the generation of the two "incorrect" random answers.

The random answer generator 70 (FIG. 4) operates to generate two random answers distinct from the correct answer generated by the arithmetic logic unit 66 (FIG. 4). The free running oscillator 480 clocks the Ck lead of each of the registers 482–488. The decade counter 506 is constantly making the 10 binary coded decimal digits available for loading into these registers 482–488.

When the shift register 498 is pulsed to indicate a correct answer has been generated, it enables the parallel load pin of the register 482 and causes the selector switches 510 and 512 to make the output of this register 482 available to one side of the exclusive OR gates 514. Another selector switch 516 places the appropriate binary coded decimal digit on the other terminal of the OR gate 514. If the two numbers are the same, the transistor 520 and inverters 526 and 530 force the shift register 498 to keep trying new numbers until a difference is detected. As soon as this occurs, the shift register 498 advances to the next position, generating a number for the next register 484. This continues until all registers 482–488 are filled, enabling the shift register 498 to step to its last position, Q4, and apply a pulse to the capacitor 534 and inverters 536 and 537 to indicate that the random answer generating unit has completed its operation.

The machine reset circuitry resets the shift register 498 to the first position after each problem, so new answers may be generated upon the signal that another valid answer has been generated by the arithmetic logic unit 66 (FIG. 3). The outputs of the four registers 482-488 are used by the display multiplexer and drivers 64 (FIG. 4) as G, H, I and J inputs.

Figure 10:
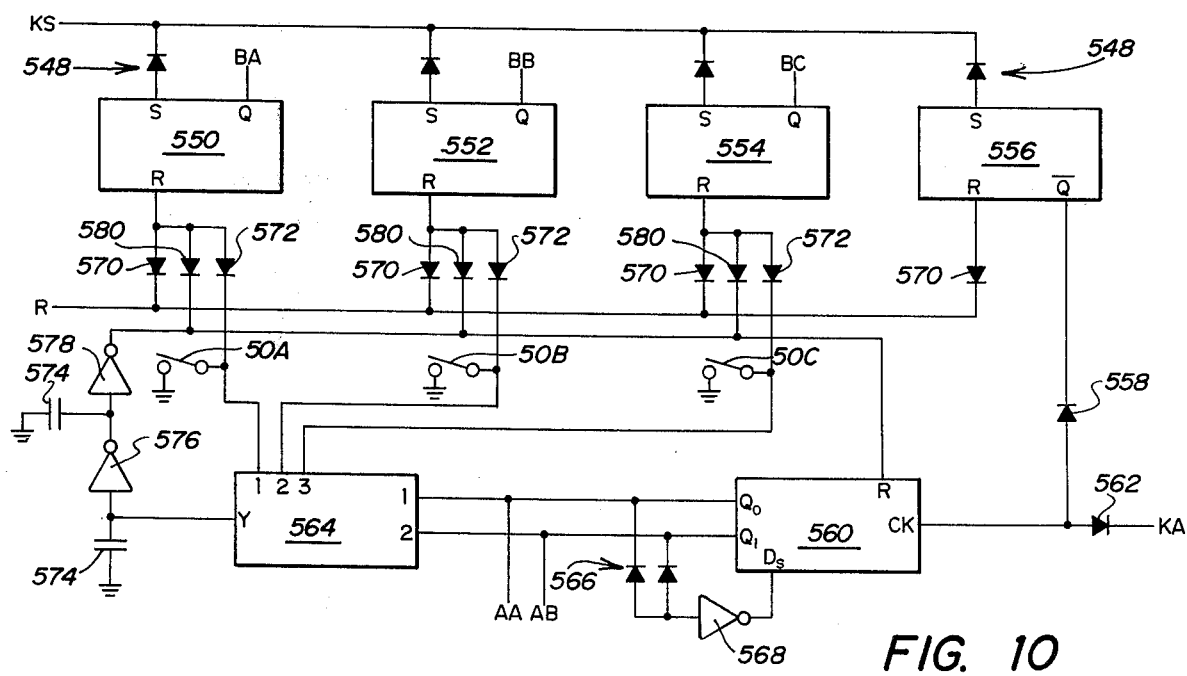
FIG. 10 is a schematic diagram of the answer position and selection controls of the invention.

FIG. 10 illustrates a schematic diagram of the answer position and selection control 72 (FIG. 4) which randomly selects which of three windows in the solution display 48 (FIG. 1) is to display the correct answer. In addition, this circuit operates to blank a window of display 48 when an incorrect answer is selected, and it places the correct answer in its proper position in the problem display 46 (FIG. 1).

Upon entry of a problem, computation of the correct answer, and random generation of two incorrect answers, the KS information signal is fed through a plurality of diodes 548 to set the four flip-flops 550, 552, 554, and 556. Each of the flip-flops 550-556 may comprise, e.g., one-half a TTL dual 7476 type flip-flop. The pulse from the random answer generator unit 70 (FIG. 4) causes flip-flop 556 to generate a signal at its $\overline{Q}$ output terminal through a diode 558 to the Ck lead of a shift register 560. A 5 bit TTL 7496 type shift register may be used as the register 560. The shift register 560 is clocked by the pulse KA through a diode 562. The signal from the two output terminals of the shift register 560 transmits in binary code a sequence of 1, 2 and 3 to set a three position selector switch 564. The output signals from the two terminals of the shift register 560 are fed through pins AA and AB to signal the arithmetic logic unit 66 (FIG. 4) of the status of the problem being worked, and they also signal the display selector unit 68 (FIG. 4) to determine the location of the correct and incorrect answers in the display window 48 (FIG. 1). A pair of diodes 566 take the output signal from the two terminals of the shift register 560 and feed them through an inverter 568 to the DS terminal of the register 560.

A plurality of diodes 570 apply the reset signal of the machine to the reset terminal of flip-flops 550–556. Momentary pushbuttons 50A, 50B, and 50C correspond to the three keys of the solution keyboard 50 of the keyboard 26 (FIG. 1). A plurality of diodes 572 connect the pushbuttons 50A, 50B and 50C to their corresponding reset terminals of flip-flops 550, 552 and 554. Pushbuttons 50A, 50B and 50C are also connected to the data selector switch 564. The presence of an output signal at the Y terminal of the selector 564 causes a signal, delayed by a pair of capacitors 574, to be routed through inverters 576 and 578 to a plurality of diodes 580 to the reset terminals of flip-flops 550, 552 and 554. The signal from inverters 576 and 578 is also connected directly to the reset terminal of the shift register 560, thereby resetting its two output terminals to 00.

The interrelationship of these components of the answer position and selection control unit 72 can be seen when considering how they function. The three flip-flops 550, 552 and 554 control the operation of the solution display 48 (FIG. 1) through their respective output signals placed on pins BA, BB, and BC. The flip-flops 550–554 blank the solution display 48 while the machine is idle.

Upon the machine's generation of a correct answer and two randomly generated false answers, the KS signal causes flip-flop 556 to stop the shift register 560 at whatever number is generating when the signal is received. The binary coded output signal of the shift register 560, fixed by the action of the flip-flop 556, is taken from pins AA and AB to set the position of the correct answer in the solution display 48 (FIG. 1). The same information from these two pins AA and AB, is used by the arithmetic logic unit 66 (FIG. 3) to enable this unit to determine the status of the problem.

A student's selection of an incorrect answer by depressing one of the buttons 50A, 50B, or 50C causes the corresponding flip-flop 550–554 to be reset, thereby blanking the corresponding solution display 48 (FIG. 1). On the other hand, when the student selects the correct answer, the selector switch 564 causes all solution displays 48 to be blanked, and resets the shift register 560 to 00, thereby causing its output at pins AA and AB to reflect that a correct answer has been selected and resets the answer position and selection control 72 to randomly position a next correct answer. This enables the arithmetic logic unit 66 (FIG. 4) to permit the clear bar 52 to step the display board holder 22 (FIG. 1), while the correct answer is displayed in its appropriate place in the problem display window 46 (FIG. 1).

Figure 11:
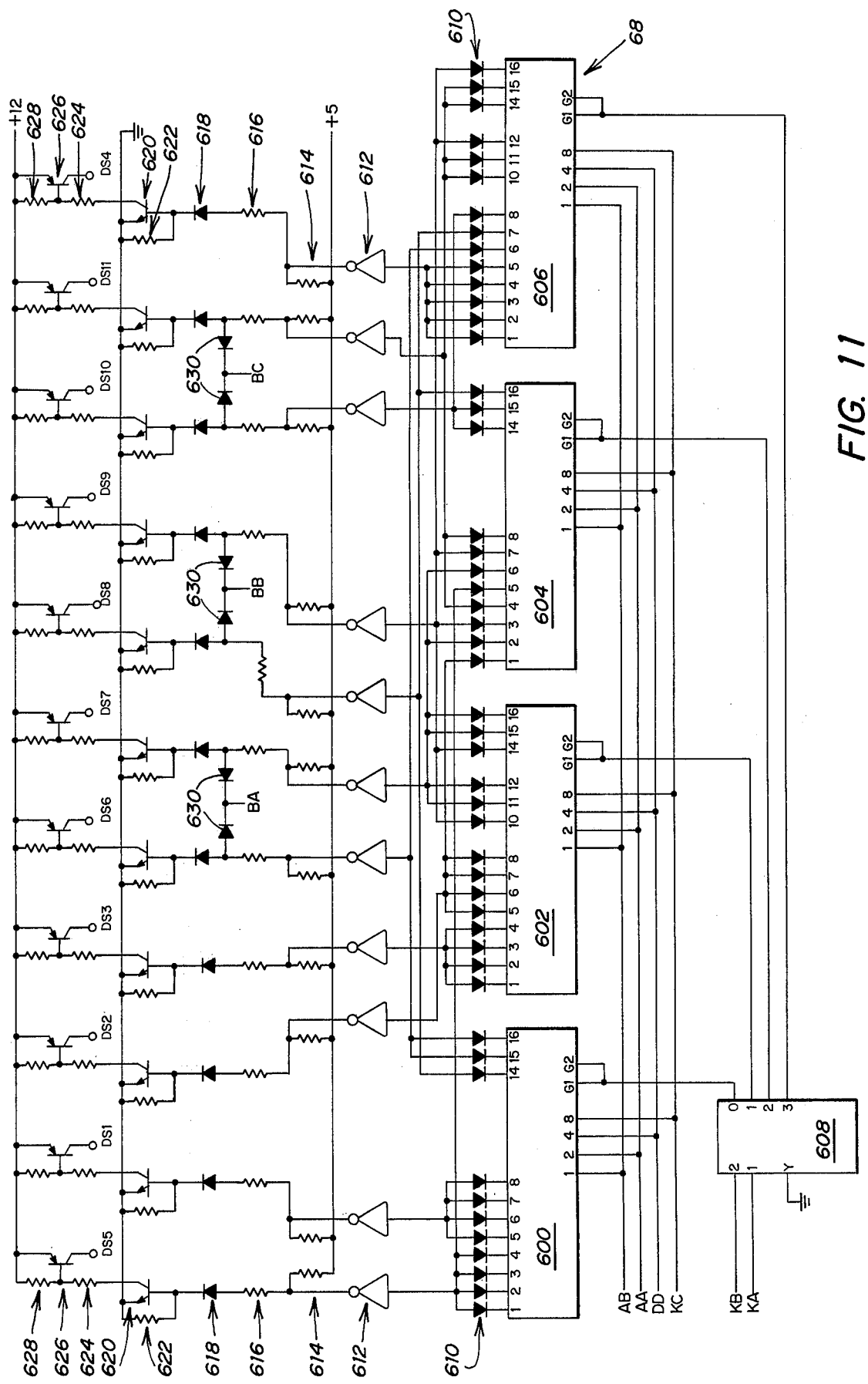
FIG. 11 is a schematic diagram of the display selector of the invention.

FIG. 11 illustrates a schematic diagram of the display selector 68 (FIG. 4) that selects which of the 11 seven segment light emitting diode displays shall be energized to display the information placed on the display drive lines by the display multiplexer and driver units 64 (FIG. 4).

The problem status signals AB and AA, the division operation signal DD, and the binary coded clock pulse KC are applied as four of the input signals to a set of four 16 position data decoders 600, 602, 604, and 606. The two other binary coded clock signals of the machine, KA and KB, are the inputs to a fifth data decoder 608, having its four outputs applied to the G1 and G2 terminals of the data decoder 600–606. Each of the data decoders 600–606 may comprise, e.g., a TTL four line to sixteen line 74154 type decoder.

The output terminals of the data decoders 600–606 are connected to a plurality of diodes 610 which are selectively connected to eleven separate level shifting circuits through a plurality of inverters 612. Each of the eleven level shifting circuits has a current limiting resistor 614 connecting a positive voltage source to the output of the inverter 612, which is now applied through a resistor 616 and a diode 618 to the base of an NPN transistor 620. The emitter of the NPN transistor 620 is connected directly to ground, while its base is connected through a resistor 622 to this ground. The signal from the collector of the NPN transistor 620 is applied through a resistor 624 to the base of a PNP transistor 626. The emitter of the transistor 626 is connected to a positive voltage while the base of transistor 626 is connected through a limiting resistor 628 to the same voltage source. Finally, the collector of each of the transistors 626 applies its signal to the anode of each of the eleven seven segment light emitting diode digital displays. Additionally, a plurality of diodes 630 are provided to take the signal from the output terminals of the flip-flops 550, 552, and 554 (FIG. 9) and apply it to the base of the appropriate NPN transistor 620 through the diode 618.

The interrelationship of these components of the display selector 68 (FIG. 4) can now be seen when considering how they function. The input lines AA, AB, and DD indicate the type and status of the problem being worked, while the input lines KA, KB and KC are machine clock pulses causing the display selector 68 to scan in sequence with the display multiplexer and driver 64 (FIG. 4). This information from these signals is applied to the five data decoders 600–608, which operate together basically as a 64 position switch. The output of this "switch" operates the eleven displays (DS1–DS11) for displaying the information the display multiplexer and drivers 64 has placed on the other end of the eleven seven segment light emitting diodes. The anodes of each of the eleven displays (DS1–DS11) are energized by one of the level shifters consisting of an inverter 612, a resistor 614, a resistor 616, a diode 618 and an NPN transistor 620, a resistor 622, a resistor 624, a resistor 628 and a PNP transistor 626.

The following logic table II indicates which of the eleven displays is enabled for each of the positions possible. The table II also lists the information the display multiplexer and driver 64 (FIG. 4) is passing on the display lines.

ter 664–670 may consist, e.g., of four TTL 5 bit shift registers type 7496.

The output of inverter 656 is also applied through a resistor 672 to the base of a PNP transistor 674, which has its emitter connected to a positive voltage source while its base is biased by this voltage through resistor 676. The output of the collector of the transistor 674 is connected to ground through a diode 678 in parallel with a solenoid coil 680.

The locking switch 34 connects a positive voltage source to a grounded capacitor 682 through a resistor 684, which is also connected through a diode 686 to the latch circuitry operating through the inverter 658.

A step input pulse is received from the arithmetic logic unit 66 (FIG. 3) through inverter 688 to the clock leads of the column shift registers 664 and 666. The row shift registers 668 and 670 in turn are clocked by the last output stage of the shift register 666.

The 10 output terminals of the column shift registers 664 and 666 are individually connected through a plurality of resistors to the base of a plurality of PNP transistors 692. The transistors 692 have their emitters connected to a positive voltage source while their base terminals are biased by this voltage source through a plurality of resistors 694. The output of the collector of the transistor 692 enables one terminal of a plurality of problem lamps 38 through a plurality of diodes 696.

A plurality of diodes 698 connect the first nine output terminals of the column shift registers 664 and 666 to an inverter 700 that has its output connected to the DS terminal of the first column shift register 664. The 10th output terminal of the two column shift registers 664 and 666 (the Q5 terminal of the shift register 666) is connected to the clock leads of the two interconnected row shift registers 668 and 670. The 10 output terminals of the two interconnected row shift registers 668 and 670 are connected to a plurality of PNP transistors 700, which have each of their base terminals

TABLE II

| | | | | | Logic Table | | | | | | | |
|---|---|---|---|---|---|---|---|---|---|---|---|---|
| | | | DD | 0 | 0 | 0 | 0 | 1 | 1 | 1 | 1 |
| | | | AA | 0 | 0 | 1 | 1 | 0 | 0 | 1 | 1 |
| | | | AB | 0 | 1 | 0 | 1 | 0 | 1 | 0 | 1 |
| KA | KB | KC | | | | | | | | | |
| 0 | 0 | 0 | | B–5 | B–5 | B–5 | B–5 | B–1 | B–1 | B–1 | B–1 |
| 1 | 0 | 0 | | D–3 | D–3 | D–3 | D–3 | D–2 | D–2 | D–2 | D–2 |
| 0 | 1 | 0 | | F–2 | F–7 | F–9 | F11 | F–5 | F–7 | F–9 | F11 |
| 1 | 1 | 0 | | A–4 | A–4 | A–4 | A–4 | E–4 | E–6 | E–8 | E10 |
| 0 | 0 | 1 | | G | G | G | G | G | G–8 | G–6 | G–6 |
| 1 | 0 | 1 | | H | H–9 | H–7 | H–7 | H | H–9 | H–7 | H–7 |
| 0 | 1 | 1 | | I | I | I | I | I | I10 | I10 | I-8 |
| 1 | 1 | 1 | | J | J11 | J11 | J–9 | J | J11 | J11 | J–9 |

Letters indicate registers selected by the display multiplexers.
Numbers indicate displays selected by the display selector.

Figure 12:
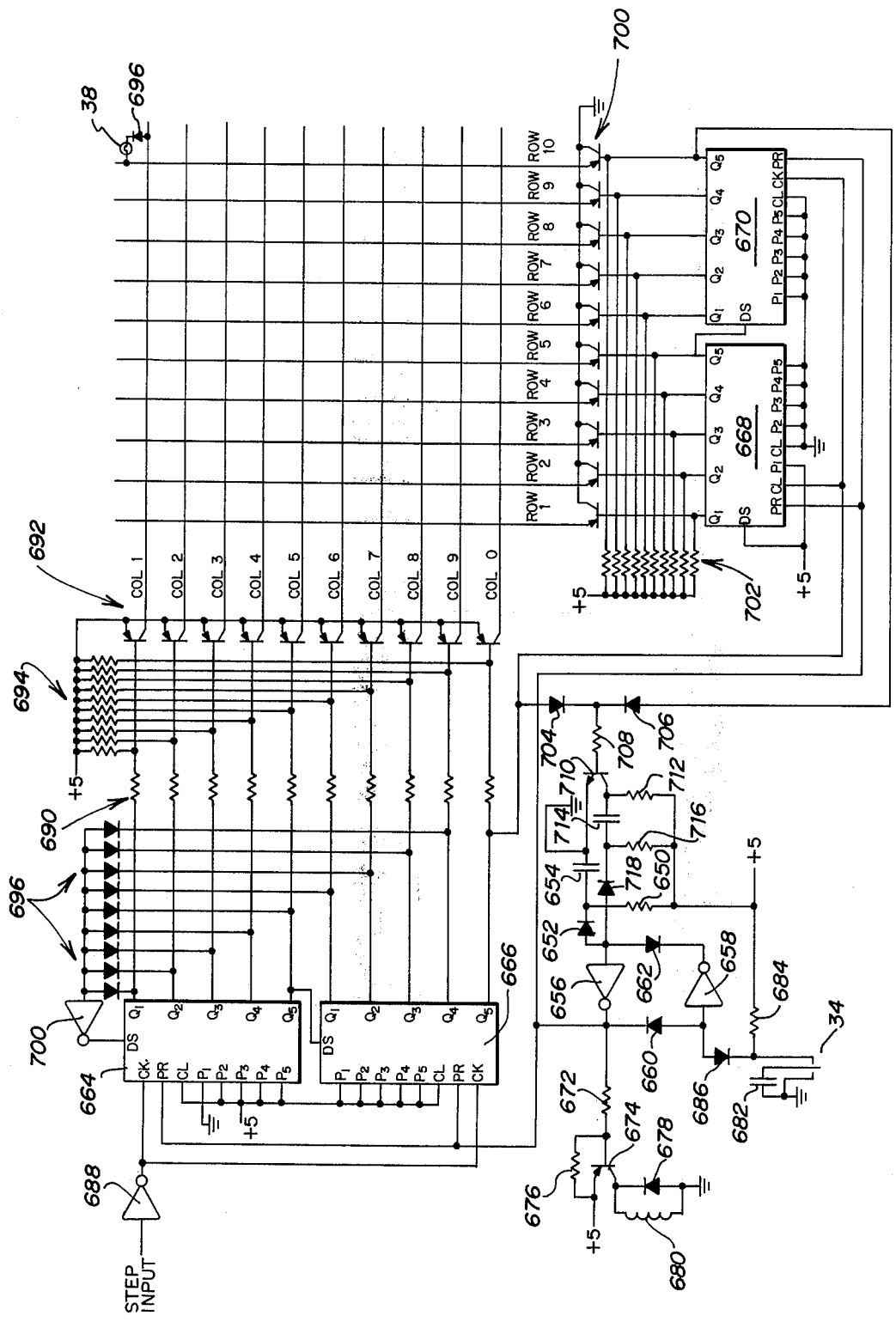
FIG. 12 is a schematic diagram of the problem sheet holder of the preferred system.

FIG. 12 illustrates a schematic diagram for the problem display holder 22 (FIG. 1) which has a plurality of problem lamps 38 to light the next problem on sheet 32 as the student correctly answers problems.

A positive voltage source is connected through a resistor 650 to a diode 652 connected to a ground point by a capacitor 654. Upon initial application of power, the diode 652 forces a latch, formed by inverters 656 and 658 connected by diodes 660 and 662, into a "standby" mode. In the standby mode, the output of inverter 656 presets a low level in the 10 bit column register consisting of shift registers 664 and 666, while it also presets a low level in the ten bit row register consisting of shift registers 668 and 670. The shift regisconnected through a plurality of resistors 702 to a positive voltage source, while the collectors are connected to a common ground. The emitter of each of the transistors 700 enables the other terminal in a row of problem lamps 38.

The last output terminal, Q5, of the column shift register 666, and the last terminal, Q5, of the row shift register 670 are connected through diodes 704 and 706, respectively, which are connected to a resistor 708 to the base of an NPN transistor 710. The emitter of the transistor 710 is connected to a ground, while the collector is connected to a positive voltage source through a resistor 712, and the collector is also connected through capacitor 714 and resistor 716 to the same voltage source. Finally, the diodes 718 connect the capacitor 714 to the latch circuitry, operating through the input to the inverter 656.

The circuit components for the problem display holder 22 can now be considered as they operate as part of the electronic mathematics training machine. The initial application of power causes the latch, consisting of inverters 656 and 658 with their outputs tied to the input of the other through the diodes 660 and 662, to be set in the standby mode. This standby mode jams the column and row registers 664–670, causing them to ignore step signals from the arithmetic logic unit 66, while at the same time placing the locking pin 36 in an unlocked position through the solenoid coil 680.

When the student slides a problem sheet 32 into place, the locking switch 34 now sets the latch, described above, in the "lock" mode. In this mode, the output of the inverter 656 causes the solenoid coil 680 to activate the locking pin 36, preventing the removal of the problem sheet 32 until both the column and row shift registers 664–670 have been stepped through all problems on the sheet 32. Further, the lock mode causes the output of inverter 656 to remove the preset (jam) signal from all registers, allowing them to advance one position when receiving a step input from the arithmetic logic unit (FIG. 3) through the output of inverter 688.

Each time the input to inverter 688 goes low, a clock pulse is applied to the column shift register 664 and 666, thereby advancing the low level one position. The advance of this low level allows the transistor 692 to successively conduct, selecting another problem lamp 38 for illumination. The plurality of diodes 696 holds the input of inverter 700 low during the first nine steps, but on the ninth step the inverter 700 is no longer held low, allowing its output to go low. On the next succeeding step, the tenth step, a low level is loaded into the column shift register 664 through its terminal DS to replace the one shifted out of the last output terminal, Q5, of the register 666. This circuit arrangement continuously shifts a single low level through the 10 output stages of the column shift register 664–666.

The last output of the column shift registers 664–666 is fed to the clock leads of the row registers 668 and 670. On the final 10th step, this output lead of the register 666 goes high to cause the row register 668–670 to select another group of 10 lamps.

At the end of ninety-nine steps, the last stage output from both the column shift register 666 and the row shift register 670 go low, thereby allowing the AND gate formed by diodes 704 and 706, resistor 708, and the transistor 710 to go high. This high level signal at the collector of the transistor 710 allows the capacitor 714 to have a zero net charge by the action of resistor 712 and 716. Thus, upon the 100th (and last) step, the AND gate (described above) again goes low, now forcing the capacitor 714 through the diode 718 to reset the latch, described above, in the standby mode. As stated previously, when the circuitry of the problem display holder 22 is in this mode the registers 664–670 are preset and the locking pin 36 releases so the problem sheet 32 may now be removed.

Figure 13:
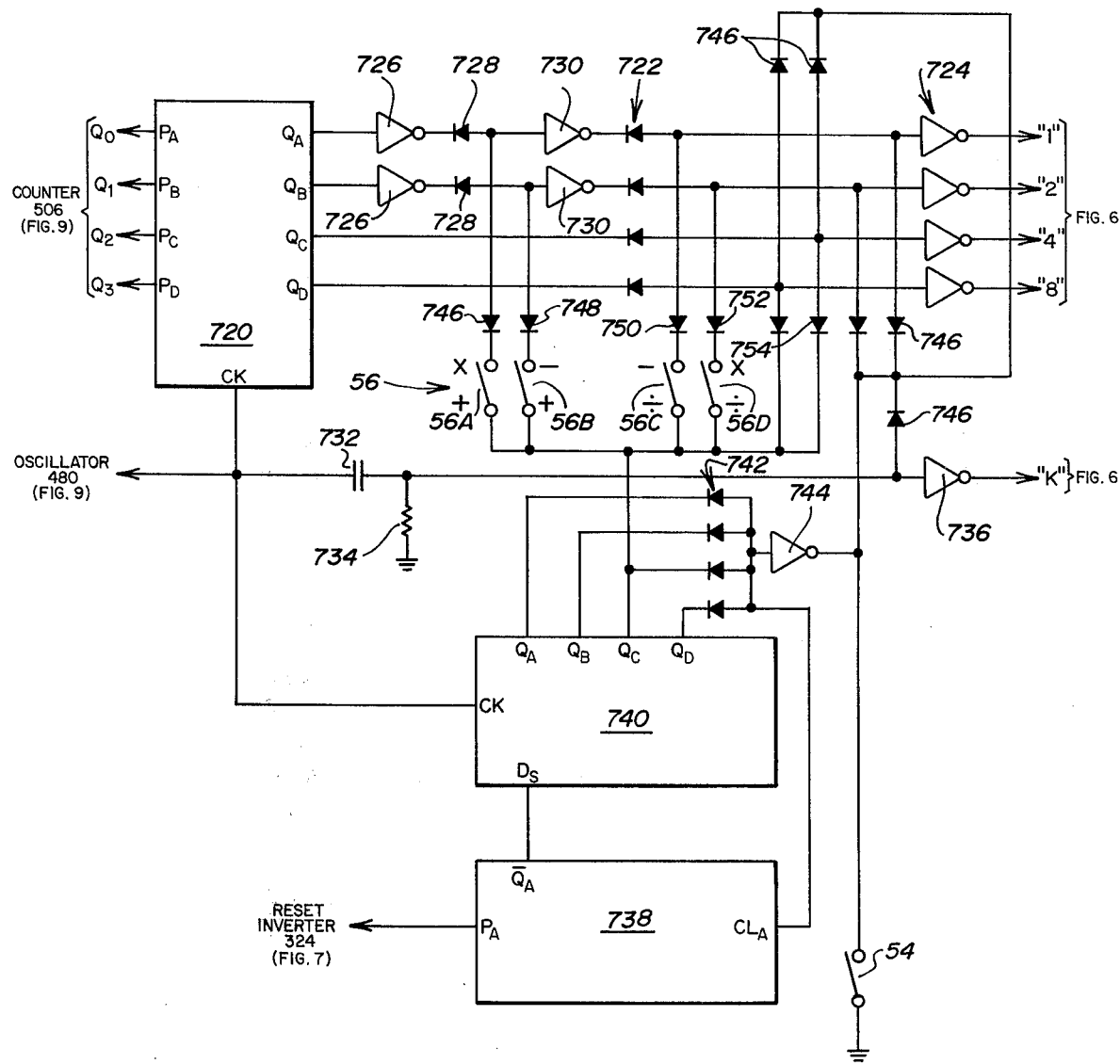
FIG. 13 is a schematic diagram of the automatic random problem control of the invention.

FIG. 13 illustrates a schematic diagram for the random problem control unit 74 (FIG. 4) which can be inserted into the circuitry of the electronic mathematics trainer for randomly generating arithmetic problems and entering these problems automatically into the input storage unit 62 (FIG. 4).

A shift register 720 receives its input from the cyclic number output of the decade counter 506 (FIG. 9) of the random answer generator. The register 720 is clocked through its CK terminal by the free-running oscillator 480 (FIG. 9). The binary coded information from the four output terminals of shift register 720 is applied through a plurality of diodes 722 to a plurality of inverters 724 that are connected to the input storage register unit 62 (FIG. 4). The output signal from the first two output terminals, $Q_a$ and $Q_b$, of register 720 are connected through a plurality of inverters 726, a plurality of diodes 728 and a second set of inverters 730 before passing through diodes 722.

The output of the free-running oscillator 480 (FIG. 9) is also connected through capacitor 732, grounded by resistor 734, through an inverter 736 to the K signal lead going to the input storage registers and control unit 62 (FIG. 3).

A control flip-flop 738 is set through its $P_a$ terminal by the reset inverters 324 (FIG. 7). The output signal from the $\overline{Q}_a$ terminal of flip-flop 738 is applied through the $D_s$ terminal of control shift register 740, thereby allowing a low level to be shifted into the first position of register 740. The register 740 is clocked through its Ck terminal by the free-running oscillator 480 (FIG. 9). As soon as the low is shifted into register 740, the plurality of diodes 742 attached to the four output terminals of register 740 force inverter 744 high, thereby allowing a plurality of diodes 746 to open inverter 736 and the plurality of inverters 724. This allows the random members to be clocked into the keyboard input lines 1, 2, 4, and 8 shown in the input storage registers 140–146 (FIG. 6). A plurality of diodes 742 also reset flip-flop 738 through its terminal $Cl_a$, allowing only one set of four inputs to be generated. Manually closing the automatic problem switch 54 disables the random problem control unit 74, and allows problems to be manually keyed into the mathematics trainer.

The third output terminal, $Q_c$ of the register 740 is connected through a manually controlled five position operation selector switch 56 to generate the operation code for the randomly generated problem. Operation selector switch 56a is connected through a diode 746 to the output from the $Q_a$ terminal of register 720 at a point between diode 728 and inverter 730. Operation selector switch 56b is connected through a diode 748 to the output of the $Q_b$ terminal of register 720 at a point between diode 728 and the inverter 730. Operation selector switch 56c is connected through a diode 750 to an input from the $Q_a$ terminal of register 720 at a point after diode 722. Operation selector switch 56d is connected through a diode 742 to the output from the $Q_b$ terminal of register 720 at a point after its diode 722. Finally, a random selection of the arithmetic operation is achievable when switches 56a–56d are in the off position, and the output of $Q_c$ of the register 740 is connected directly through the plurality of diodes 754 to the output from the $Q_c$ and $Q_d$ terminal of register 720 at a point after diodes 722.

Operation of switches 56a and 56b will cause a logic low signal to be loaded during the third digit generation, irregardless of the data of the output signal from terminal $Q_a$ and $Q_b$ of register 720. Likewise, operation of switches 56c and 56d will cause a logic high signal to be loaded into the keyboard line irregardless of the state of the outset signal from terminal $Q_a$ and $Q_b$ of register 720. Different combinations of the switch 56 will allow a desired arithmetic operation to be jammed into the machine, or allow a random operation to be entered.

The electronic mathematics trainer described hereinabove serves to encourage students and the like in developing their arithmetic skills. A student is free to selectively enter any valid arithmetic problems, since the trainer will accept only integer operations and positive signed numbers. The entry of an invalid problem will cause the trainer to reset, making it ready for a valid problem.

The problems are selected from the problem sheet bearing a plurality of arithmetic problems.

The machine rewards the student at the outset by displaying a correctly entered problem to give him a feeling of achievement in approaching the problem. In addition, showing the problem to the student in the display serves another purpose in repeating the problem to the student. At this point, the student has seen the arithmetic problem first from a problem sheet, he has taken some action to key this same problem into the trainer, and he sees the problem for the third time as it is displayed on the trainer.

The next action the student will take is to select the correct answer for the entered problem from a solution display that includes the correct answer and at least one incorrect answer. The trainer randomly positions the correct answer in the solution display to prevent the correct answer from appearing in the same position during the solution of a number of problems. The trainer provides an incentive to the student in selecting the correct displayed answer by enabling him to rapidly progress through a number of arithmetic problems in a given exercise.

The student is alerted to the selection of an incorrect answer by the blanking or elimination of that answer from the solution display. However, the problem remains unsolved and the student must find the correct answer to the problem before the trainer can be cleared for entry of a next arithmetic problem. This trainer enables each student to work at his own pace, so that slow learners are not embarrassed by holding back other students in the class and fast learners may advance at the rate they set forth themselves. When the student selects the correct answer, the solution is reinforced in the student's mind by displaying it adjacent to the problem. The student may now clear the problem and solution display area of the machine making it ready for the entry of a next problem.

The next problem to be entered by the student will be the next illuminated problem on the problem sheet of the trainer. A teacher may thus visually check the progress of each student in a particular exercise by glancing at the problem sheet holder.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An electronic mathematics trainer comprising:
   means for selectively entering an arithmetic problem to be solved,
   means for computing the correct answer to the arithmetic problem,
   means for generating at least one incorrect answer to the arithmetic problem,
   means for displaying the correct and incorrect answers,
   means for randomly positioning the correct and incorrect answers on said display means,
   means operable for selecting one of the displayed answers, and
   means for clearing the entered arithmetic problem upon the selection of the correct displayed answer.

2. The electronic mathematics trainer of claim 1 and further comprising:
   a problem display wherein the unsolved entered arithmetic problem is displayed.

3. The electronic mathematics trainer of claim 2 and further comprising:
   means for retaining the display of the entered problem in said problem display until the selection of the correct displayed answer.

4. The electronic mathematics trainer of claim 2 and further comprising:
   means for entering the selected correct displayed answer in said problem display adjacent the displayed unsolved entered arithmetic problem.

5. The electronics mathematics trainer of claim 2 wherein said means for displaying answers and said problem display comprise a plurality of light emitting diodes.

6. The electronic mathematics trainer of claim 2 wherein said means for displaying answers and said problem display comprise a plurality of heat emitting elements.

7. The electronic mathematics trainer of claim 1 wherein said means for selectively entering an arithmetic problem to be solved includes a keyboard containing keys for the decimal numbers zero through nine and the four arithmetic operation modes of addition, subtraction, multiplication, and division.

8. The electronic mathematics trainer of claim 7 and further comprising:
   means for retaining the operation mode of the entered arithmetic problem after clearing the entered arithmetic problem upon the selection of the correct displayed answer.

9. The electronic mathematics trainer of claim 7 and further comprising:
   means for preventing the entering of more than one operation mode for an arithmetic problem.

10. The electronic mathematics trainer of claim 7 wherein said keyboard includes keys embossed with Braille alphabet characters or similar characters for indicating the function of said key to a sightless person.

11. The electronic mathematics trainer of claim 1 and further comprising:
    means for indicating whether the selected displayed answer is the correct answer or an incorrect answer.

12. The electronic mathematics trainer of claim 1 and further comprising:
    a problem list bearing a plurality of arithmetic problems,
    a problem list holder for receiving said problem list,
    means in said holder for sequentially indicating ones of the arithmetic problems to be selectively entered and solved, and
    means in said display holder responsive to the selection of the correct displayed answer for advancing said indicting means to a next arithmetic problem.

13. The electronic mathematics trainer of claim 1 and further comprising:

means for accepting only valid arithmetic problems to be solved by said computing means, wherein said valid problems include only integer operations and positive signed numbers.

14. An electronic mathematics trainer comprising:

means for selectively entering an arithmetic problem to be solved, a problem display for indicating the entered arithmetic problem, means for computing the correct answer to the entered arithmetic problem, means for generating at least one incorrect answer to the entered arithmetic problem, a solution display for indicating the correct and incorrect answers, means for randomly positioning the correct and incorrect answers in said solution display, means operable for selecting one of the displayed answers, means for indicating the selection of a correct displayed answer, means for indicating the selection of an incorrect displayed answer, and means for clearing the entered arithmetic problem upon selection of the correct displayed answer.

15. The electronic mathematics trainer of claim 14 and further comprising:

means for accepting only valid arithmetic problems to be solved by said computing means, wherein said valid problems include only integer operations and positive signed numbers.

16. The electronic mathematics trainer of claim 14 and further comprising:

means for displaying the selected correct displayed answer in the proper place in the format of the displayed problem.

17. The electronic mathematics trainer of claim 14 and further comprising:

means for retaining the operation mode of an entered arithmetic problem upon selection of the correct displayed answer and subsequent to operation of said clearing means to clear the entered arithmetic problem.

18. The electronic mathematics trainer of claim 14 wherein said means for selecting one of the displayed answers includes a plurality of answer selection keys located so that each of said keys is adjacent a displayed answer in said solution display.

19. The electronic mathematics trainer of claim 14 wherein said solution display and said problem display include a plurality of light emitting diodes.

20. The electronic mathematics trainer of claim 14 wherein said solution display and said problem display include a plurality of heat emitting elements.

21. The electronic mathematics trainer of claim 14 wherein said means for selectively entering an arithmetic problem includes a keyboard containing keys for the decimal numbers zero through nine and the four arithmetic operations of addition, subtraction, multiplication, and division.

22. The electronic mathematics trainer of claim 21 wherein said keyboard includes keys with raised characters of the Braille alphabet or similar characters for indicating the function of said keyboard to a sightless person.

23. The electronic mathematics trainer of claim 14 wherein said means for indicating the selection of an incorrect displayed answer include means for blanking said solution display of the incorrect answer.

24. An electronic mathematics trainer comprising:

a problem sheet bearing a plurality of arithmetic problems, an arithmetic problem display holder for receiving said problem sheet, means in said display holder for sequentially indicating ones of the arithmetic problems on said problem sheet to be solved, a keyboard encoder for entering the arithmetic problem indicated on said display holder, a display unit for displaying the arithmethic problem entered in said encoder, means for computing a correct answer to the arithmetic problem entered by said keyboard encoder, means for generating at least one incorrect answer to the arithmetic problem entered by said keyboard encoder, means on said display unit for randomly displaying the correct and incorrect answer, means operable for selecting one of the displayed answers, means in said display holder responsive to the selection of the correct displayed answer for advancing said indicating means to a next arithmetic problem on said problem sheet, and means for clearing the arithmetic problem displayed by said display unit upon selection of the correct displayed answer.

25. The electronic mathematics trainer of claim 24 wherein said display unit includes means for entering the correct answer in the display of the arithmetic problem upon selection of the correct displayed answer.

26. The electronic mathematics trainer of claim 24 and further comprising:

means for retaining the arithmetic operation of an entered arithmetic problem after said means for clearing the arithmetic problem clears the arithmetic problem.

27. The electronic mathematics trainer of claim 24 and further comprising:

means for indicating the selection of the correct displayed answer.

28. The electronic mathematics trainer of claim 24 and further comprising:

means for indicating the selection of an incorrect displayed answer.

29. The electronic mathematics trainer of claim 24 and further comprising:

means in said display holder for retaining said problem sheet until the selection of the correct displayed answer for all the problems on said problem sheet.

30. The electronic mathematics trainer of claim 24 wherein said display unit comprises a plurality of light-emitting diodes.

31. The electronic mathematics trainer of claim 24 wherein said display unit comprises a plurality of heat emitting elements.

32. The electronic mathematics trainer of claim 24 wherein said keyboard encoder comprises keys containing raised Braille alphabet characters or similar means for indicating the functions of said keys to a sightless person.

33. An electronic mathematics trainer comprising:
a problem sheet bearing a plurality of arithmetic problems to be entered into said keyboard encoder,
a problem sheet holder for receiving said problem sheet,
means in said holder for sequentially indicating an arithmetic problem on said problem sheet,
a student operated keyboard encoder for selectively entering the decimal numbers and arithmetic operation mode of an arithmetic problem on said problem sheet to be solved,
a problem display from displaying the entered arithmetic problem,
means for computing the correct answer,
means for generating at least one incorrect answer,
a solution display for displaying the correct and incorrect answers,
means for randomly positioning the correct and incorrect answers in said solution display,
means operable for selecting one of the displayed answers,
means for indicating the selection of a correct answer,
means for indicating the selection of an incorrect answer,
means for displaying the selected correct answer on said problem display,
means in said holder responsive to the selection of the correct displayed answer for advancing said indicating means to a next problem,
means for retaining said problem sheet in said holder until the correct displayed answer has been selected for all problems on said problem sheet, and
means operable for clearing the arithmetic problem entered by said keyboard encoder upon selection of the correct displayed answer.

34. The electronic mathematics trainer of claim 33 and further comprising:
means for accepting only valid arithmetic problems for said computing means, wherein said valid problems include only integer operations and positive signed numbers.

35. The electronic mathematics trainer of claim 33 wherein said solution display includes means for simultaneously displaying the correct and incorrect answers.

36. The electronic mathematics trainer of claim 33 and further comprising:
a plurality of momentary pushbuttons with one of said pushbuttons adjacent each of the displayed answers to provide said means for indicating the selection of the correct or an incorrect answer.

37. The electronic mathematics trainer of claim 33 and further comprising:
means for retaining the entered arithmetic operation mode upon operating the means for clearing the arithmetic problem entered by said keyboard encoder.

38. The electronic mathematics trainer of claim 33 and further comprising means for correcting an erroneous entry of a decimal number or an arithmetic operation of an arithmetic problem.

39. The electronic mathematics trainer of claim 33 wherein said keyboard encoder includes means for a sightless person to enter the decimal numbers and arithmetic operation mode of an arithmetic problem to be solved, wherein said solution display includes means for enabling a sightless person to detect the display of correct and incorrect answers, wherein said problem and display includes means for enabling a sightless person to determine the entered arithmetic problem, and wherein said means for indicating the selection of a correct or an incorrect answer includes means for enabling a sightless person to determine whether the selected answer is correct or incorrect.

40. A method of teaching arithmetic skills, comprising the steps of:
displaying a plurality of arithmetic problems to be solved,
entering the decimal numbers and the arithmetic operation mode of one of the arithmetic problems into an electronic mathematics trainer,
displaying the entered arithmetic problem without an answer to the student,
computing a correct answer and at least one incorrect answer,
randomly displaying the correct answer and at least one incorrect answer,
selecting one of said answers, and
displaying the correct answer together with the entered problem upon the selection of a correct answer.

41. The method of teaching arithmetic skills of claim 40 and further comprising the step of:
indicating to a student when an incorrect answer is selected.

42. The method of teaching arithmetic skills of claim 40 and further comprising the step of:
indicating to a student when a correct answer is selected.

43. The method of teaching arithmetic skills of claim 40 and further comprising the step of:
identifying in sequence one of the plurality of displayed arithmetic problems upon each selection of a correct displayed answer for entering into the electronic mathematics trainer for solution.

44. The method of teaching arithmetic skills of claim 43 and further comprising the step of:
retaining the display of a plurality of arithmetic problems for use in the electronic mathematics trainer until a correct displayed answer has been selected for all the displayed arithmetic problems.

45. In a mathematics training system, the combination comprising:
means for selectively entering an arithmetic problem to be solved,
means for computing the correct answer for the problem to be solved,
means for computing at least one incorrect answer for the problem to be solved,
an answer display having at least two display positions, and
means for randomly controlling the display of said correct and incorrect answers on said answer display, such that said correct answer may be displayed on any of said display positions.

46. The combination of claim 45 wherein two incorrect answers are generated and further comprising:
three display positions in said answer display.

47. The combination of claim 45 and further comprising:
a plurality of two position electronic switches for controlling the operation of said display positions.
a pulsed shift register for continuously outputting a sequence of digital signals each corresponding to a distinct display position for determining the location of said correct answer, a position selector switch for receiving the continuous output of digital signals from said shift register and for controlling the output of said electronic switches, and a data control switch for randomly stopping said shift register, the output of said register determining the location of said correct answer in said display positions.

48. The combination of claim 45 and further comprising:

a plurality of switches corresponding to each of the data display positions for selecting an answer, and means for blanking the display position displaying an incorrect answer upon its selection.

49. The combination of claim 46 wherein said two positions electronic switches comprise multivibrators.

50. The combination of claim 46 and further comprising:

a problem display for formatting an arithmetic problem, means for generating digital clock signals, a plurality of data selectors composing an electronic switch continuously rotated through all of the switch positions by said digital clock signals, thereby enabling the problem to be solved to said problem display and the correct and incorrect answers to be displayed in said answer display, means for detecting the operation mode of the training system, and at least one operation selector switch responsive to said detecting means for selectively routing the problem to be solved on the correct answer to said data selectors.

51. The combination of claim 45 and further comprising:

means for suppressing the display of leading zeros in answers displayed by said answer display.

52. The combination of claim 45 wherein said means for computing in incorrect answer comprises:

a free running oscillator, a plurality of incorrect answer shift registers clocked by said oscillator, means for generating digital clock signals, a decade counter pulsed by said digital clock signals, a control shift register responsive to the computation of a correct answer by the trainer, a ring counter operated by said control shifter for enabling successive ones of said incorrect answer shift registers to load data from said decade counter, a plurality of exclusive OR gates, a plurality of data selectors for loading the output from said incorrect answer shift registers to one side of said OR gate upon said data selectors being enabled by said ring counter, a correct answer selector for loading the correct answer on the other side of said OR gate, means for loading a next number into the enabled one of said incorrect answer shift registers from said decade counter upon said OR gates indicating the correct answer and the output of said incorrect answer shift register are the same, and means for advancing said control shift register to the next one of said incorrect answer shift registers upon said OR gate detecting that the correct answer differs from the output of the enabled one of said incorrect answer shift registers.

53. The electronic circuit of claim 52 and further comprising:

a two position electronic control switch for applying a clock pulse to the plurality of said incorrect answer shift registers upon said OR gates first detecting a difference between the output of said incorrect answer shift registers and the correct answer.

54. In a mathematics training system, the combination comprising:

means for selectively entering an arithmetic problem to be solved, means for computing the correct answer for a problem to be solved, means for randomly generating a sequence of numbers, means for comparing the correct answer to the randomly generated numbers, means for selecting a randomly generated number determined by said comparing means to be different from the correct answer, and means for displaying the correct answer and a randomly generated number determined by said selecting means.

55. The combination of claim 54 wherein said selecting means operates only upon the second number determined by said comparing means to be different from the correct answer, thereby preventing the same randomly generating numbers from being repeatedly selected.

56. An electronic mathematics trainer comprising:

means for automatically generating a random arithmetic problem;

means for automatically entering the randomly generated arithmetic problem, a display unit for displaying the arithmetic problem automatically entered, means for computing a correct answer to the automatically entered arithmetic problem, means for generating at least one incorrect answer to the automatically entered arithmetic problem, means on said display unit for randomly displaying the correct and incorrect answer, means operable for selecting one of the displayed answers, and means for clearing the arithmetic problem displayed by said display unit on selection of the correct displayed answer.

57. The electronic mathematics trainer of claim 56 wherein said display unit includes means for entering the correct answer in the display of the arithmetic problem upon selection of the correct displayed answer.

58. The electronic mathematics trainer of claim 56 and further comprising: means for indicating the selection of the correct displayed answer.

59. The electronic mathematics trainer of claim 56 and further comprising: means for indicating the selection of an incorrect displayed answer.

60. The electronic mathematics trainer of claim 56 and further comprising: means for selecting the arithmetic operation for the automatically generated random arithmetic problem.

61. The electronic mathematics trainer of claim 56 and further comprising: means for selecting random generation of the operation mode of the automatically randomly generated arithmetic problem.

62. A method of teaching arithmetic skills, comprising the steps of:
- automatically generating a random arithmetic problem to be solved,
- automatically entering the decimal numbers and arithmetic operation mode of the generated arithmetic problem into an electronic mathematics trainer,
- displaying the entered arithmetic problem without an answer to the student,
- computing a correct answer and at least one incorrect answer,
- randomly displaying the correct answer and at least one incorrect answer,
- selecting one of said answers, and
- displaying the correct answer with the entered problem upon the selection of a correct answer.

63. The method of teaching arithmetic skills of claim 62 and further comprising the step of: indicating to a student when an incorrect answer is selected.

64. The method of teaching arithmetic skills of claim 62 and further comprising the step of: indicating to a student when a correct answer is selected.

* * * * *

UNITED STATES PATENT OFFICE
CERTIFICATE OF CORRECTION

Patent No. 4,010,556      Dated March 8, 1977

Inventor(s) Carolyn Ellsworth and L. W. Herring

It is certified that error appears in the above-identified patent and that said Letters Patent are hereby corrected as shown below:

Abstract, line 20, "oder" should be --order--.
Col. 3, line 12, "substraction, mulitplication" should be --subtraction, multiplication--;
        line 15, "remainder" should be --reminder--.
Col. 4, line 44, "until the" should be --until all the--;
        line 63, "on should be --or--.
Col. 5, line 10, "subjacent lamp" should be --subjacent problem lamp--;
        line 59, "of" should be --on--;
        line 62, "unti" should be --unit--;
        line 65, "integar" should be --integer--.
Col. 6, line 57, "faces" should be --face--;
        line 63, "operation" should be --operations--.
Col. 7, line 10, "charging circuit" should be --same charging circuit--.
Col. 8, line 16, "0" should be --∅--;
        line 37, "compromise" should be --comprise--.
Col. 14, line 4, "a/nth of the angular" should be --1/nth of the regular--.
Col. 15, line 56, "(DS1-DS111)" should be --(DS1-DS11)--.
Col. 21, line 10, "standby" should be --"standby"--;
        line 10, "standby mode. This standby mode" should be --"standby" mode. This "standby" mode--;
        line 23, "the lock mode" should be --the "lock" mode--;
        line 60, "the standby mode" should be --the "standby" mode--.
Col. 27, line 13, "from" should be --for--.
Col. 29, line 17, "claim 46" should be --claim 45--;
        line 18, "positions" should be --position--;
        line 19, "claim 46" should be --claim 45--;

UNITED STATES PATENT OFFICE

CERTIFICATE OF CORRECTION

Patent No. 4,010,556          Dated March 8, 1977

Inventor(s) Carolyn Ellsworth and L. W. Herring

It is certified that error appears in the above-identified patent and that said Letters Patent are hereby corrected as shown below:

Column 29, line 42, "in" should be -- an --.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*